United States Patent

Andermo et al.

[11] Patent Number: 5,936,399
[45] Date of Patent: Aug. 10, 1999

[54] INDUCTIVE POSITION TRANSDUCER HAVING A MULTI-TAP RECEIVER WINDING

[75] Inventors: Nils Ingvar Andermo, Kirkland; Karl G. Masreliez, Bellevue, both of Wash.

[73] Assignee: Mitutoyo Corporation, Kawasaki, Japan

[21] Appl. No.: 08/931,287

[22] Filed: Sep. 16, 1997

[51] Int. Cl.⁶ .............................. G01B 7/02; G01B 7/14; G01D 5/20; H03M 1/22

[52] U.S. Cl. .............................. 324/207.17; 324/207.24; 336/45; 336/75; 340/870.32

[58] Field of Search .......................... 324/207.17–207.19, 324/207.24, 207.15, 207.16; 336/45, 130, 131, 136, 129, 115, 75; 340/870.32–870.36; 318/653, 661

[56] References Cited

U.S. PATENT DOCUMENTS

| | | |
|---|---|---|
| 4,354,099 | 10/1982 | Rayment et al. . |
| 4,425,511 | 1/1984 | Brosh . |
| 4,503,922 | 3/1985 | Brosh et al. . |
| 4,638,250 | 1/1987 | Shen-Orr et al. . |
| 4,658,153 | 4/1987 | Brosh et al. . |
| 5,120,907 | 6/1992 | Shinbori et al. . |

FOREIGN PATENT DOCUMENTS

| | | |
|---|---|---|
| 95/31696 | 11/1995 | WIPO . |
| 97/19323 | 5/1997 | WIPO . |

*Primary Examiner*—Jay Patidar
*Attorney, Agent, or Firm*—Oliff & Berridge, PLC

[57] ABSTRACT

An induced current position transducer has a multi-tap winding. The multi-tap winding allows for digital interpolation of position to a small fraction of a wavelength, thereby reducing the amount of analog interpolation performed by the transducer electronics. In addition, a multi-tap receiver winding enhances the total output signal strength, thereby allowing a smaller receiver winding length along the direction of the measurement axis. Furthermore, a multi-tap receiver winding exhibits low impedance, thereby improving the output signal time constant. The multi-tap receiver winding of this invention comprises a plurality of receiver winding loops offset with respect to each other along the measuring axis, and electrically connected in series. Preferably, the signal contributions of each loop combine to form a "vector circle".

40 Claims, 16 Drawing Sheets

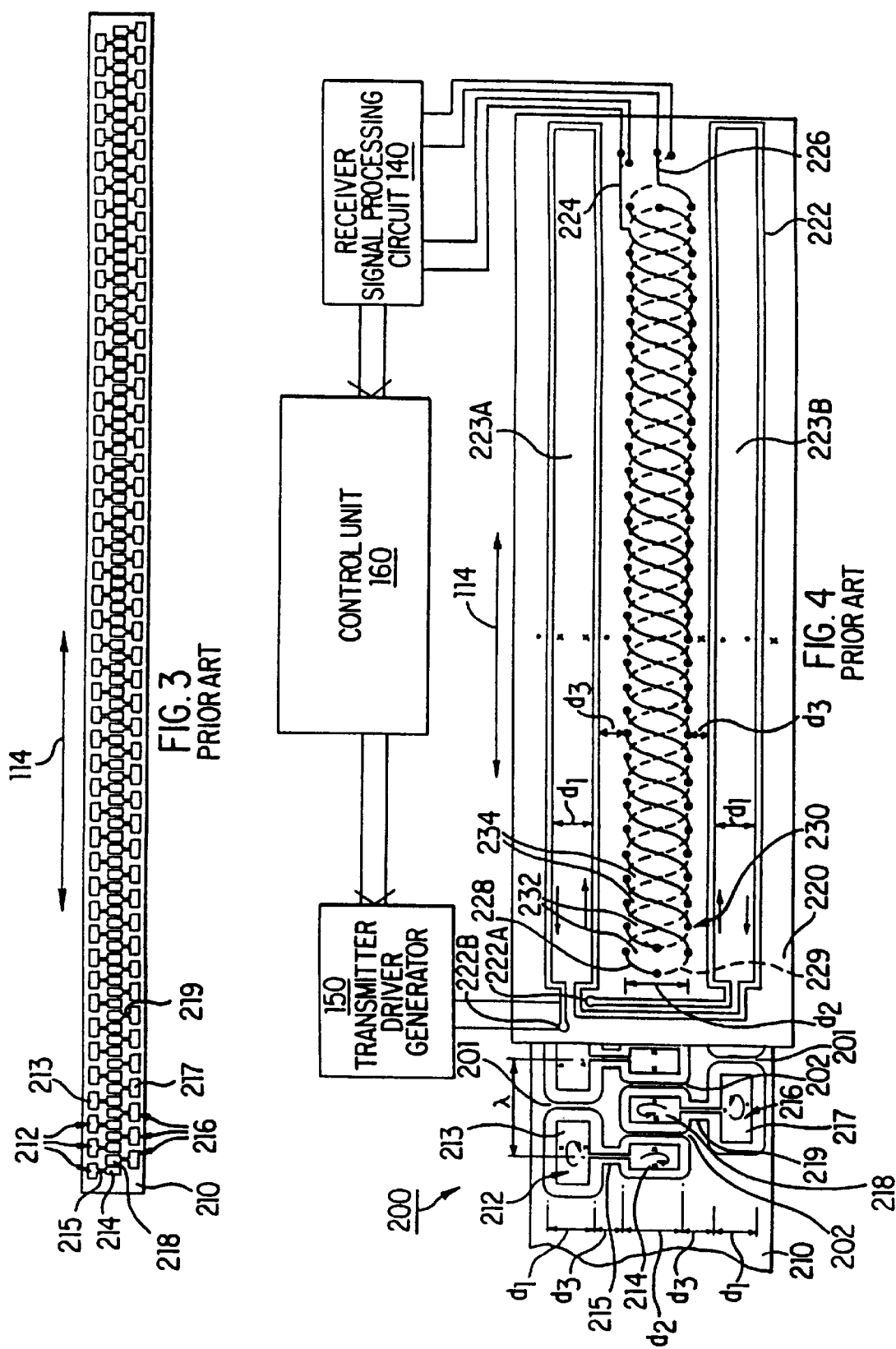

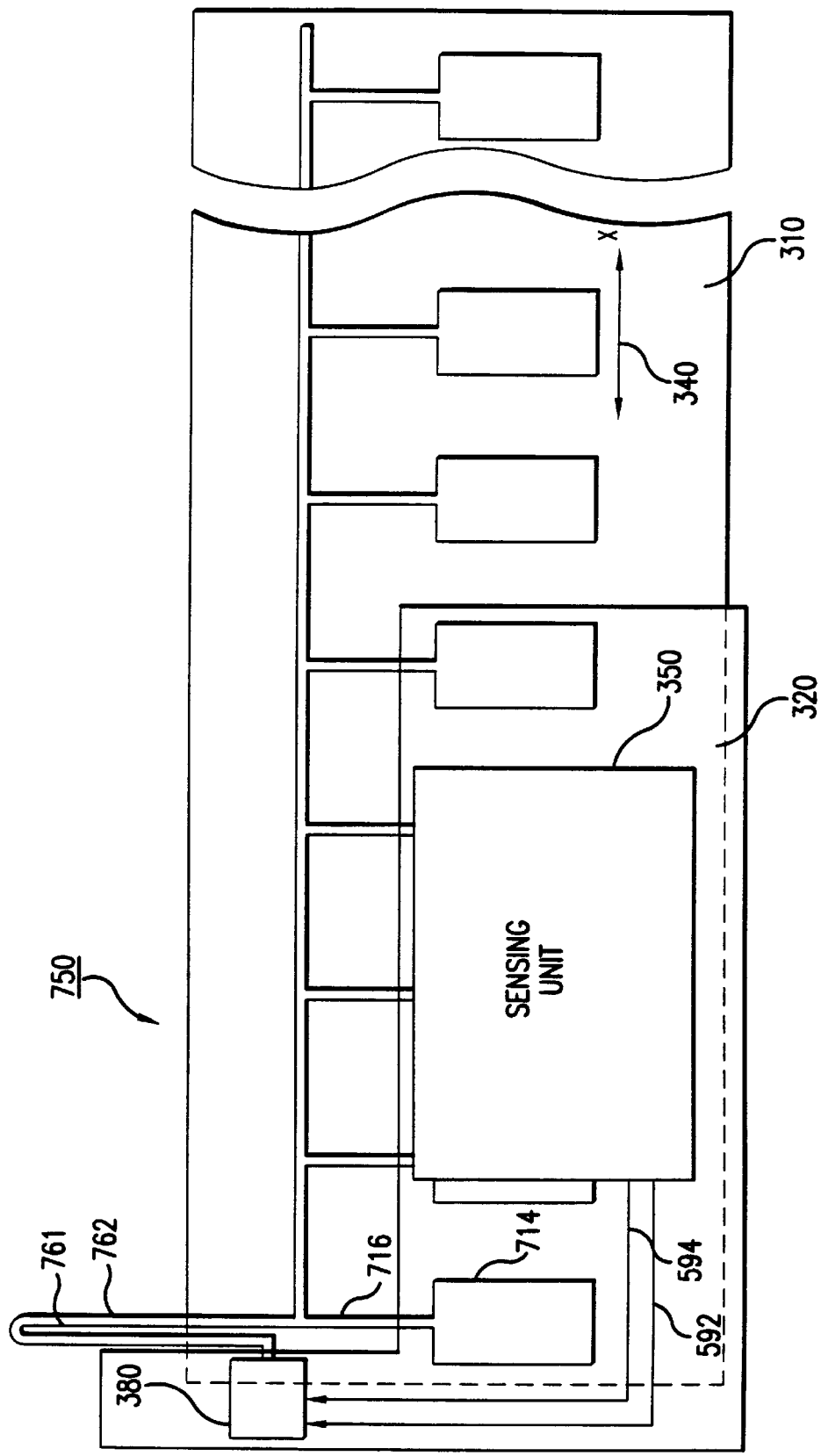

INDUCTIVE POSITION TRANSDUCER HAVING A MULTI-TAP RECEIVER WINDING

BACKGROUND OF THE INVENTION

1. Field of Invention

This invention relates to induced current linear and rotary position transducers. In particular, this invention is directed to an induced current position transducer with an improved multi-tap winding configuration to increase signal sensitivity and provide a digital interpolation capability.

2. Description of Related Art

U.S. patent application Ser. No. 08/441,769, filed May 16, 1995, and incorporated herein in its entirety, discloses an incremental induced current position transducer. U.S. patent application Ser. No. 08/645,483, filed May 13, 1996, and incorporated herein in its entirety, discloses an electronic caliper using an induced current position transducer. Both applications disclose associated signal processing techniques for induced current position transducers.

The operation of the induced current position transducers of these applications is generally shown in FIGS. 1 and 2. As shown in FIG. 1, the induced current position transducer 100 comprises a read head 120 that is movable relative to a scale 110. The scale 110 is preferably formed on a printed circuit board using standard printed circuit board technology. The read head 120 can also be formed on a printed circuit board. However, the read head 120 can also be formed on an integrated circuit (IC), preferably a silicon IC using standard silicon IC processing techniques.

A plurality of magnetic flux modulators 112 are distributed along a measuring axis 114 of the induced current position transducer 100 at a pitch equal to a wavelength $\lambda$, which is described in more detail below. The flux modulators 112 have a nominal width along the measuring axis 114 of $\lambda/2$. The flux modulators 112 have a width d in a direction perpendicular to the measuring axis 114.

The read head 120 includes a generally rectangular transmitter winding 122 that is connected to a drive signal generator 150. The drive signal generator 150 provides a time-varying drive signal to the transmitter winding 122. The time-varying drive signal is preferably a high frequency sinusoidal signal, a pulse signal, or an exponentially decaying sinusoidal signal. When the time-varying drive signal is applied to the transmitter winding 122, the time-varying current flowing in the transmitter winding 122 generates a corresponding time-varying, or changing, magnetic field. The transmitter winding 122 is generally rectangularly shaped, and the dimensions are chosen such that the generated magnetic field is substantially constant within a flux region in the central portion of the transmitter winding 122.

The read head 120 further includes a first receiver winding 124 and a second receiver winding 126 positioned on the read head within the flux region inside the transmitter winding 122. Each of the first receiver winding 124 and the second receiver winding 126 is formed by a plurality of first loop segments 128 and second loop segments 129. The first loop segments 128 are formed on a first surface of a layer of the printed circuit board or IC. The second loop segments 129 are formed on another surface of the layer of the printed circuit board or IC. The layer of the printed circuit board or IC acts as an electrical insulation layer between the first loop segments 128 and the second loop segments 129. Each end of each of the first loop segments 128 is connected to one end of one of the second loop segments 129 through vias 130 formed in the layer of the printed circuit board or IC.

The first and second loop segments 128 and 129 are suitably sinusoidally shaped. Accordingly, as shown in FIG. 1, the first and second loop segments 128 and 129 forming each of the receiver windings 124 and 126 form a sinusoidally-shaped periodic pattern having the wavelength $\lambda$. Each of the receiver windings 124 and 126 are thus formed having a plurality of loops 132 and 134.

The loops 132 and 134 in each of the first and second receiver windings 124 and 126 has a width along the measuring axis 114 equal to $\lambda/2$. Thus, each pair of adjacent loops 132 and 134 has a width equal to $\lambda$. Furthermore, the first and second loop segments 128 and 129 go through a full sinusoidal cycle in each pair of adjacent loops 132 and 134. Thus, $\lambda$ corresponds to the sinusoidal wavelength of the first and second receiver windings 124 and 126. Furthermore, the receiver winding 126 is offset by $\lambda/4$ from the first receiver winding 124 along the measuring axis 114. That is, the first and second receiver windings 124 and 126 are in quadrature.

The changing drive signal from the drive signal generator 150 is applied to the transmitter winding 122 such that current flows in the transmitter winding 122 from a first terminal 122a, through the transmitter winding 122 and out through a second terminal 122b. Thus, the magnetic field generated by the transmitter winding 122 descends into the plane of FIG. 1 within the transmitter winding 122 and rises up out of the plane of FIG. 1 outside the transmitter winding 122. Accordingly, the changing magnetic field within the transmitter winding 122 generates an induced electromotive force (EMF) in each of the loops 132 and 134 formed in the receiver windings 124 and 126.

The loops 132 and 134 have opposite winding directions. Thus, the EMF induced in the loops 132 has a polarity that is opposite to the polarity of the EMF induced in the loops 134. The loops 132 and 134 enclose the same size areas and thus nominally the same amount of magnetic flux. Therefore, the absolute magnitude of the EMF generated in each of the loops 132 and 134 is nominally the same.

There are preferably equal numbers of loops 132 and 134 in each of the first and second receiver windings 124 and 126. Ideally, the positive polarity EMF induced in the loops 132 is exactly offset by the negative polarity EMF induced in the loops 134. Accordingly, the net nominal EMF on each of the first and second receiver windings 124 and 126 is zero and it is intended that no signal is output from the first and second receiver windings 124 and 126 as a result solely of the direct coupling from the transmitter winding 122 to the receiver windings 124 and 126.

When the read head 120 is placed in proximity to the scale 110, the changing magnetic flux generated by the transmitter winding 122 also passes through the flux modulators 112. The flux modulators 112 modulate the changing magnetic flux and can be either flux enhancers or flux disrupters.

When the flux modulators 112 are provided as flux disrupters, the flux modulators 112 are formed as raised portions of a conductive substrate, i.e., like gear teeth, or preferably as conductive plates, or thin conductive films on the scale 110. As the changing magnetic flux passes through the conductive plates, raised conductive portions, or thin films, eddy currents are generated in the conductive plates, raised conductive portions, or thin films. These eddy currents in turn generate magnetic fields having a field direction that is opposite to that of the magnetic field geneated by the transmitter winding 122. Thus, in areas proximate to each of the flux disrupter-type flux modulators 112, the net magnetic flux is less than the net magnetic flux in areas distant from the flux disrupter-type flux modulators 112.

When the scale 110 is positioned relative to the read head 120 such that the flux disrupters 112 are aligned with the positive polarity loops 132 of the receiver winding 124, the net EMF generated in the positive polarity loops 132 is reduced compared to the net EMF generated in the negative polarity loops 134. Thus, the receiver winding 124 becomes unbalanced and has a net negative signal across its output terminals 124a and 124b.

Similarly, when the flux disrupters 112 are aligned with the negative polarity loops 134, the net magnetic flux through the negative polarity loops 134 is disrupted or reduced. Thus, the net EMF generated in the negative polarity loops 134 is reduced relative to the net EMF generated in the positive polarity loops 132. Thus, the first receiver winding 124 has a net positive signal across its output terminals 124a and 124b.

When the flux modulators 112 are provided as flux enhancers, this result is exactly reversed. The flux-enhancer-type flux modulators 112 are formed by portions of high magnetic permeability material provided in or on the scale 110. The magnetic flux generated by the transmitter winding 122 preferentially passes through the high magnetic permeability flux-enhancer-type flux modulators 112. That is, the density of the magnetic flux within the flux enhancers 112 is enhanced, while the flux density in areas outside the flux enhancers 112 is reduced.

Thus, when the flux enhancers 112 are aligned with the positive polarity loops 132 of the second receiver winding 126, the flux density through the positive polarity loops 132 is greater than the flux density passing through the negative polarity loops 134. Thus, the net EMF generated in the positive polarity loops 132 increases, while the net EMF induced in the negative polarity loops 134 decreases. This appears as a positive signal across the terminals 126a and 126b of the second receiver winding 126.

When the flux enhancers are aligned with the negative polarity loops 134, the negative polarity loops 134 generate an enhanced EMF relative to the EMF induced in the positive polarity loops 132. Thus, a negative signal appears across the terminals 126a and 126b of the second receiver winding 126. It should also be appreciated that, as outlined in the incorporated references, both the flux enhancing and flux disrupting effects can be combined in a single scale, where the flux enhancers and the flux disrupters are interleaved along the length of the scale 110. This would act to enhance the modulation of the induced EMF, because the effects of both types of flux modulator additively combine.

As indicated above, the width and height of the flux modulators 112 are nominally λ/2 and d, respectively, while the pitch of the flux modulators 122 is nominally λ. Similarly, the wavelength of the periodic pattern formed in the first and second receiver windings 122 and 124 is nominally λ and the height of the loops 132 and 134 is nominally d. Furthermore, each of the loops 132 and 134 encloses a nominally constant area.

FIG. 2A shows the position-dependent output from the positive polarity loops 132 as the flux modulators 112 move relative to the positive polarity loops 132. Assuming the flux modulators 112 are flux disrupters, the minimum signal amplitude corresponds to those positions where the flux disrupters 112 exactly align with the positive polarity loops 132, while the maximum amplitude positions correspond to the flux disrupters 112 being aligned with the negative polarity loops 134.

FIG. 2B shows the signal output from each of the negative polarity loops 134. As with the signal shown in FIG. 2A, the minimum signal amplitude corresponds to those positions where the flux disrupters 112 exactly align with the positive polarity loops 132, while the maximum signal output corresponds to those positions where the flux disrupters exactly align with the negative polarity loops 134. It should be appreciated that if flux enhancers were used in place of flux disrupters, the minimum signal amplitudes in FIGS. 2A and 2B would correspond to the flux enhancers 112 aligning with the negative polarity loops 134, while the maximum signal amplitude would correspond to the flux enhancers 112 aligning with the positive polarity loops 132.

FIG. 2C shows the net signal output from either of the first and second receiver windings 124 and 126. This net signal is equal to the sum of the signals output from the positive and negative polarity loops 132 and 134, i.e., the sum of the signals shown in FIGS. 2A and 2B. The net signal shown in FIG. 2C should ideally be symmetrical around zero, that is, the positive and negative polarity loops 132 and 134 should be exactly balanced to produce a symmetrical output with zero offset.

However, a "DC" (position independent) component often appears in the net signal in a real device. This DC component is the offset signal $V_o$. This offset $V_o$, complicates signal processing. This offset has two major sources.

First, the full amplitude of the transmitter field passes through the first and second receiver windings 124 and 126. As outlined above, this induces a voltage in each loop 132 and 134. The induced voltage is nominally canceled because the loops 132 and 134 have opposite winding directions. However, to perfectly cancel the induced voltage in the receiver windings requires the positive and negative loops 132 and 134 to be perfectly positioned and shaped for a perfectly balanced result. The tolerances on the balance are critical because the voltages induced directly into the receiver winding loops 132 and 134 by the transmitter winding 122 are much stronger than the modulation in the induced voltage caused by the flux modulators 112. In practice, fabrication tolerances always prevent perfect balance.

Second, the spatially modulated field created by the flux modulators 112 also exhibits an average position-independent offset component. That is, the flux modulators 112 within the magnetic field generated by the transmitter winding 122 all create the same polarity spatial modulation in the magnetic field. For example, when flux disrupters are used, the induced eddy current field from the flux modulators has an offset because the flux disrupters within the transmitter field all create a same polarity secondary magnetic field. At the same time, the space between the flux disrupters does not create a secondary magnitude field.

Thus, each positive polarity loop 132 and each negative polarity loop 134 of the receiver windings 124 and 126 sees a net magnetic field that varies between a minimum value and a maximum value having the same polarity. The mean value of this function is not balanced around zero, i.e., it has a large nominal offset. Similarly, when flux enhancers are used, the field modulation due to the flux enhancers has a bias because the enhancers within the transmitter winding 122 all create the same field modulation, while the space between the modulators provides no modulation. Each positive and negative polarity loop 132 or 134 of each receiver winding 124 or 126 therefore sees a spatially modulated field that varies between a minimum value and a maximum value having the same polarity. The mean value of this function also has a large nominal offset.

A receiver winding having an equal number of similar positive and negative polarity loops 132 and 134 helps eliminate the offset components. However, any imperfection in the balance between the positive and negative polarity loops 132 and 134 allows residual offsets according to the previous description.

Both of these offset components are expected to be canceled solely by the symmetry between the positive and negative polarity loops 132 and 134 in the first and second receiver windings 124 and 126. This puts very stringent requirements on the manufacturing precision of the receiver windings 124 and 126. Experience in manufacturing the transducer 100 indicates it is practically impossible to eliminate this source of error from the induced current position transducer 100.

Any signal component which is independent of the transducer position, such as the aforementioned offset components, is regarded as an extraneous signal to the operation of the transducer. Such extraneous signals complicate the required signal processing circuitry.

U.S. patent application Ser. No. 08/834,432 filed Apr. 16, 1997, and incorporated herein in its entirety, discloses a reduced offset induced current position transducer. The reduced offset induced current position transducer utilizes improved winding configurations that increase the proportion of the useful output signal component relative to extraneous ("offset") components of the output signal, without requiring increased transducer fabrication accuracy. The winding configurations also provide means to enhance the degree of output signal change per unit of displacement, for a given measuring range.

The operation of the reduced offset induced current position transducer is generally shown in FIGS. 3 and 4. The transducer of FIGS. 3 and 4 produces an output type usually referred to as "incremental". "Incremental" means the transducer produces a cyclic output which is repeated according to a design-related increment of transducer displacement. As shown in FIG. 3, the reduced-offset scale 210 includes a first plurality of closed-loop coupling loops 212 interleaved with a second plurality of closed-loop coupling loops 216. Each of the coupling loops 212 and 216 is electrically isolated from the others of the first and second plurality of coupling loops 212 and 216.

Each of the first plurality of coupling loops 212 includes a first loop portion 213 and a second loop portion 214 connected by a pair of connecting conductors 215. Similarly, each of the second plurality of coupling loops 216 includes a first loop portion 217 and a second loop portion 218 connected by a pair of connecting conductors 219.

In the first plurality of coupling loops 212, the first loop portions 213 are arranged along one lateral edge of the scale 210 and are arrayed along the measuring axis 114. The second loop portions 214 are arranged along the center of the scale 210 and are arrayed along the measuring axis. The connecting conductors 215 extend perpendicularly to the measuring axis 114 to connect the first loop portions 213 to the second loop portions 214.

Similarly, in the second plurality of coupling loops 216, the first loop portions 217 are arranged along a second lateral edge of the scale 210 and arrayed along the measuring axis 114. The second loop portions 218 are arranged along the center of the scale 210 along the measuring axis, interleaved with the second loop portions 214 of coupling loops 212. The connecting conductors 219 extend generally perpendicularly to the measuring axis 114 to connect the first loop portions 217 to the second loop portions 218.

As shown in FIG. 4, the read head 220 of the transducer 200 includes a transmitter winding 222 having a first transmitter winding portion 223A and a second transmitter winding portion 223B. The first transmitter winding portion 223A is provided at a first lateral edge of the read head 220, while the second transmitter winding portion 223B is provided at the other lateral edge of the read head 220. Each of the first and second transmitter winding portions 223A and 223B have substantially the same long dimension extending along the measuring axis 114. Furthermore, each of the first and second transmitter winding portions 223A and 223B have a short dimension that extends in a direction perpendicular to the measuring axis 114 a distance $d_1$.

The terminals 222A and 222B of the transmitter winding 222 are connected to the transmitter drive signal generator 150. The transmitter drive signal generator 150 outputs a time-varying drive signal to the transmitter winding terminal 222A. Thus, a time-varying current flows through the transmitter winding 222 from the transmitter winding terminal 222A to the transmitter terminal 222B, as indicated in FIG. 4.

In response, the first transmitter winding portion 223A generates a primary magnetic field that rises up out of the plane of FIG. 4 inside the first transmitter winding portion 223A and descends into the plane of FIG. 4 outside the loop formed by the first transmitter winding portion 223A. In contrast, the second transmitter winding portion 223B generates a primary magnetic field that rises out of the plane of FIG. 4 outside the loop formed by the second transmitter winding portion 223B and descends into the plane of FIG. 4 inside the loop formed by the second transmitter winding portion 223B. In response, a current is induced in the coupling loops 212 and 216 that counteracts the change in magnetic field.

Thus, the induced current in each of the coupling loop sections 213 and 217 flows in a direction opposite to the current flowing in the respective adjacent portions of the transmitter loops 223A and 223B. As shown in FIG. 4, adjacent ones of the second loop portions 214 and 218 in the center section of the scale have loop currents having opposite polarities. Thus, a secondary magnetic field is created having field portions of opposite polarity periodically distributed along the center section of the scale. The wavelength $\lambda$ of the periodic secondary magnetic field is equal to the distance between successive second loop portions 214 (or 218).

The read head 220 also includes first and second receiver windings 224 and 226 that are generally identical to the first and second receiver windings 124 and 126 shown in FIG. 1. In particular, similarly to the first and second receiver windings 124 and 126 shown in FIG. 1, the first and second receiver windings 224 and 226 are each formed by a plurality of sinusoidally shaped loop segments 228 and 229 formed on opposite sides of an insulating layer of the printed circuit board or IC forming the read head 220.

The loop segments 228 and 229 are linked through vias 230 to form alternating positive polarity loops 232 and negative polarity loops 234 in each of the first and second receiver windings 222 and 226. The receiver windings 224 and 226 are positioned in the center of the read head 220 between the first and second transmitter portions 223A and 223B. Each of the first and second receiver windings 224 and 226 extends in the direction perpendicular to the measuring axis a distance $d_2$.

Extraneous (position independent and scale independent) coupling from the transmitter loops to the receiver loops is generally avoided in this configuration. That is, the primary magnetic fields generated by the first and second transmitter portions 223A and 223B point in opposite directions in the vicinity of the first and second receiver windings 224 and 226. Thus, the primary magnetic fields counteract each other in the area occupied by the first and second receiver windings 224 and 226. Ideally, the primary magnetic fields completely counteract each other in this area.

The first and second receiver windings 224 and 226 are spaced equal distances $d_3$ from the inner portions of the first and second transmitter winding portions 223A and 223B. Thus, the magnetic fields generated by each of the first and second transmitter winding portions 223A and 223B in the portion of the read head 220 occupied by the first and second receiver windings 224 and 226 are in symmetric opposition. The associated inductive effects thus effectively cancel each other out. Thus, the net voltage induced in the first and second receiver windings 224 and 226 by extraneous direct coupling to the first and second transmitter winding portions 223A and 223B is reduced to a first extent by positioning the transmitter windings away from the receiver windings. Secondly, the symmetric design effectively reduces the net extraneous coupling to zero.

Each of the first plurality of coupling loops 212 is arranged at a pitch equal to a wavelength $\lambda$ of the first and second receiver windings 224 and 226. Furthermore, the first loop portions 213 each extends a distance along the measuring axis 114 which is as close as possible to the wavelength $\lambda$ while still providing the insulating space 201 between adjacent ones of the first loop portions 213. In addition, the first loop portions 213 extend the distance $d_1$ in the direction perpendicular to the measuring axis 114.

Similarly, each of the second plurality of coupling loops 216 is also arranged at a pitch equal to the wavelength $\lambda$. The first loop portions 217 also extend as close as possible to each other along the measuring axis to the wavelength $\lambda$ while providing the space 201 between adjacent ones of the first loop portions 217. The first loop portions 217 also extend the distance $d_1$ in the direction perpendicular to the measuring axis 114.

The second loop portions 214 and 218 of the first and second pluralities of coupling loops 212 and 216 are also arranged at a pitch equal to the wavelength $\lambda$. However, each of the second loop portions 214 and 218 extends along the measuring axis as close as possible to only one-half the wavelength $\lambda$. An insulating space 202 is provided between each adjacent pair of second loop portions 214 and 218 of the first and second pluralities of coupling loops 212 and 216, as shown in FIG. 4. Thus, the second loop portions 214 and 218 of the first and second pluralities of coupling loops 212 and 216 are interleaved along the length of the scale 210. Finally, each of the second loop portions 214 and 218 extends the distance $d_2$ in the direction perpendicular to the measuring axis 114.

The second loop portions 214 and 218 are spaced the distance $d_3$ from the corresponding first loop portions 213 and 217. Accordingly, when the read head 220 is placed in proximity to the scale 210, as shown in FIG. 4, the first transmitter winding portion 223A aligns with the first loop portions 213 of the first plurality of coupling loops 212. Similarly, the second transmitter winding portion 223B aligns with the first loop portions 217 of the second plurality of coupling loops 216. Finally, the first and second receiver windings 224 and 226 align with the second loop portions 214 and 218 of the first and second coupling loops 212 and 216.

In operation, a time-varying drive signal is output by the transmitter drive signal generator 150 to the transmitter winding terminal 222A. Thus, the first transmitter winding portion 223A generates a first changing magnetic field having a first direction while the second transmitter winding portion 223B generates a second magnetic field in a second direction that is opposite to the first direction. This second magnetic field has a field strength that is equal to a field strength of the first magnetic field generated by the first transmitter winding portion 223A.

Each of the first plurality of coupling loops 212 is inductively coupled to the first transmitter winding portion 223A by the first magnetic field generated by the first transmitter winding portion 223A. Thus, an induced current flows clockwise through each of the first plurality of coupling loops 212. At the same time, the second plurality of coupling loops 216 is inductively coupled to the second transmitter winding portion 223B by the second magnetic field generated by the second transmitter winding portion 223B. This induces a counterclockwise current to flow in each of the second plurality of coupling loops 216. That is, the currents through the second portions 214 and 218 of the coupling loops 212 and 216 flow in opposite directions.

The clockwise flowing current in each of the second portions 214 of the first coupling loops 212 generates a third magnetic field that descends into the plane of FIG. 4 within the second portions 214. In contrast, the counterclockwise flowing currents in the second loop portions 218 of the second coupling loops 216 generate a fourth magnetic field that rises out of the plane of FIG. 4 within the second loop portions 218 of the second coupling loops 216. Thus, a net alternating magnetic field is formed along the measuring axis 114. This net alternating magnetic field has a wavelength which is equal to the wavelength $\lambda$ of the first and second receiver windings 224 and 226.

Accordingly, when the positive polarity loops 232 of the first receiver winding 224 are aligned with either the second loop portions 214 or 218, the negative polarity loops 234 of the first receiver winding 224 are aligned with the other of the second loop portions 214 or 218. This is also true when the positive polarity loops 232 and the negative polarity loops 234 of the second receiver winding 226 are aligned with the second loop portions 214 and 218. Because the alternating magnetic field generated by the second loop portions 214 and 218 is spatially modulated at the same wavelength as the spatial modulation of the first and second receiver windings 214 and 216, the EMF generated in each of the positive and negative polarity loops 232 and 234 when aligned with the second loop portions 214 is equal and opposite to the EMF generated when they are aligned with the second loop portions 218.

Thus, the net output of the positive polarity loops 232, as the read head 220 moves relative to the scale 210 is a sinusoidal function of the position "x" of the read-head along the scale and the offset component of the output signal due to extraneous coupling is nominally zero. Similarly, the net output from the negative polarity loops 234, as the read head 220 moves relative to the scale 210, is also a sinusoidal function of the position "x" of the read head along the scale and the offset component of the output signal due to extraneous coupling is nominally zero. The EMF contributions from the positive polarity loops 232 and the negative polarity loops 234 are in phase. They thus generate a net position-dependent output signal corresponding to FIG. 2C, but the DC bias $V_o$ due to extraneous coupling is reduced to insignificance in this preferred embodiment.

Finally, the first and second receiver windings 224 and 226, like the first and second receiver windings 124 and 126, are in quadrature. Thus, the output signal generated by the first receiver winding 224 as a function of x and output to the receiver signal processing circuit 140 is 90° out of phase with the signal output by the second receiver winding 226 as a function of x to the receiver signal processing circuit 140.

The receiver signal processing circuit 140 inputs and samples the output signals from the first and second receiver windings 224 and 226, converts these signals to digital values and outputs them to the control unit 160. The control unit 160 processes these digitized output signals to determine the relative position x between the read head 220 and the scale 210 within a wavelength λ.

Based on the nature of the quadrature output from the first and second receiver windings 224 and 226, the control unit 160 is able to determine the direction of relative motion between the read head 220 and the scale 210. The control unit 160 counts the number of partial or full "incremental" wavelengths λ traversed, by signal processing methods well-known to those skilled in the art and disclosed in the incorporated references. The control unit 160 uses that number and the relative position within a wavelength λ to output the relative position between the read head 220 and the scale 210 from a set origin. The control unit 160 also outputs control signals to the transmitter drive signal generator 150 to generate the time-varying transmitter drive signal.

All of the above-described inductive transducers would benefit from improved signal sensitivity and more accurate interpolation of position increments smaller than a wavelength of the modulation of the magnetic field in the transducer.

SUMMARY OF THE INVENTION

This invention provides an induced current position transducer using a multi-tap winding configuration.

This invention also provides a multi-tap winding that allows for digital interpolation of position to a small fraction of a wavelength. The multi-tap winding thus reduces the amount of analog interpolation performed by the transducer electronics.

In addition, this invention provides a multi-tap winding that enhances the total output signal strength.

Furthermore, this invention provides a multi-tap winding that exhibits low impedance. The multi-tap winding thus improves the output signal time constant.

The preferred multi-tap receiver winding of this invention comprises a plurality of receiver winding loops offset with respect to each other along the measuring axis by λ/N, where "N" is the number of receiver winding loops, and electrically connected in series to form a "vector circle" of signal functions from each of the receiver winding loops.

The receiver winding loops are preferably formed as a planar pattern on two layers of a printed circuit board or electronic integrated circuit. Each receiver winding loop has at least one electrical output tap. Each of the electrical output taps represents a different spatial phase position on the receiver winding loop. Thus, a total of (N*P) digital phase positions per wavelength are provided by the N receiver winding loops, where "P" is the number of electrical output taps per receiver winding loop.

The receiver winding loops are connected in series by connecting the ends of the receiver winding loops. A "vector circle" can thus be constructed by combination of the signal functions from each receiver winding loop. Digital interpolation of transducer position within a wavelength is accomplished by: (1) switching diametrically opposed connections to the electrical output taps until a spatial phase position giving a minimum signal is reached; and (2) performing a final interpolation based on the value of the residual signal.

The induced current position transducer of this invention includes a scale member and a read head that are movable relative to each other along a measuring axis. The preferred read head includes a multi-tap receiver winding extending along the measuring axis. The read head further includes a transmitter winding extending along the measuring axis for generating a time-varying magnetic field.

In a first preferred embodiment of the induced current position transducer of this invention, the transmitter winding is generally rectangularly-shaped, and the multi-tap receiver winding is positioned on the read head within the flux region inside the rectangular-shaped transmitter winding. In addition, the scale member has a plurality of magnetic flux modulators distributed along the measuring axis.

In a second preferred embodiment of the induced current position transducer of this invention, the transmitter winding is divided into a first transmitter loop and a second transmitter loop. The first and second transmitter loops extend along the measuring axis and are positioned on opposite sides of the multi-tap receiver windings.

In the second preferred embodiment, the scale member has a plurality of first coupling loops extending along the measuring axis and interleaved with a plurality of second coupling loops also extending along the measuring axis. The first coupling loops have a first portion aligned with the first transmitter winding loop and a second portion aligned with the multi-tap receiver winding. Similarly, the second coupling loops have a first portion aligned with the second transmitter loop and a second portion aligned with the multi-tap receiver winding.

In a third preferred embodiment of the induced current position transducer of this invention, the transmitter winding extends along the measuring axis and is positioned external to the multi-tap receiver winding in a direction perpendicular to the measuring axis.

In the third preferred embodiment, the scale member has a plurality of coupling loops extending along the measuring axis. The coupling loops have a first portion aligned with the transmitter winding loop and a second portion aligned with the multi-tap receiver winding loops.

In a fourth preferred embodiment of the induced current position transducer of this invention, the transmitter winding is divided into a first transmitter loop and a second transmitter loop. The first and second transmitter loops extend along the measuring axis and are each positioned on one side of the multi-tap receiver windings.

In the fourth preferred embodiment, the scale member has a plurality of first coupling loops extending along the measuring axis and interleaved with a plurality of second coupling loops also extending along the measuring axis. The first coupling loops have a first portion aligned with the first transmitter winding loop and a second portion aligned with the multi-tap receiver winding. Similarly, the second coupling loops have a first portion aligned with the second transmitter loop and a second portion aligned with the multi-tap receiver winding.

In a fifth embodiment of the induced current position transducer of this invention, a single transmitter loop is placed along side the multi-tap receiver windings on the read head. The scale member in this embodiment has a plurality of first coupling loops arrayed along the measuring axis and interleaved with a second plurality of coupling loops also arrayed along the measuring axis. Both the first and second coupling loops have a first portion aligned with the transmitter loop and a second portion aligned with the multi-tap receiver winding.

The first and second portions of each first coupling loop are connected in series and are "untwisted." Thus, the magnetic fields induced in the first and second portions of the first coupling loops have the same polarity. In contrast, the first and second portion of each second coupling loop are connected in series and are "twisted." In this case, the magnetic fields induced in the first and second portions of the second coupling loops have opposite polarities. This creates an alternating induced magnetic field along the measuring axis in the area under the multi-tap receiver winding in response to excitation of the transmitter loop.

The transmitter winding configurations in the second through fifth preferred embodiments substantially eliminate several extraneous signal components. This results in simplified signal processing and improved transducer accuracy and robustness, in an economical design.

These and other features and advantages of this invention are described in or are apparent in the following detailed description of the preferred embodiments.

BRIEF DESCRIPTION OF THE DRAWINGS

The preferred embodiments of this invention will be described in detail, with reference to the following figures, wherein:

FIG. 3 shows a scale for a known reduced offset induced current position transducer;

FIG. 4 shows a known reduced offset induced current position transducer;

FIG. 21 shows an alternative embodiment of the multi-tap induced current position transducer of this invention which uses a spatially modulated transmitter winding on the scale member, in place of passive scale elements.

DETAILED DESCRIPTION OF THE PREFERRED EMBODIMENTS

Figure 1:
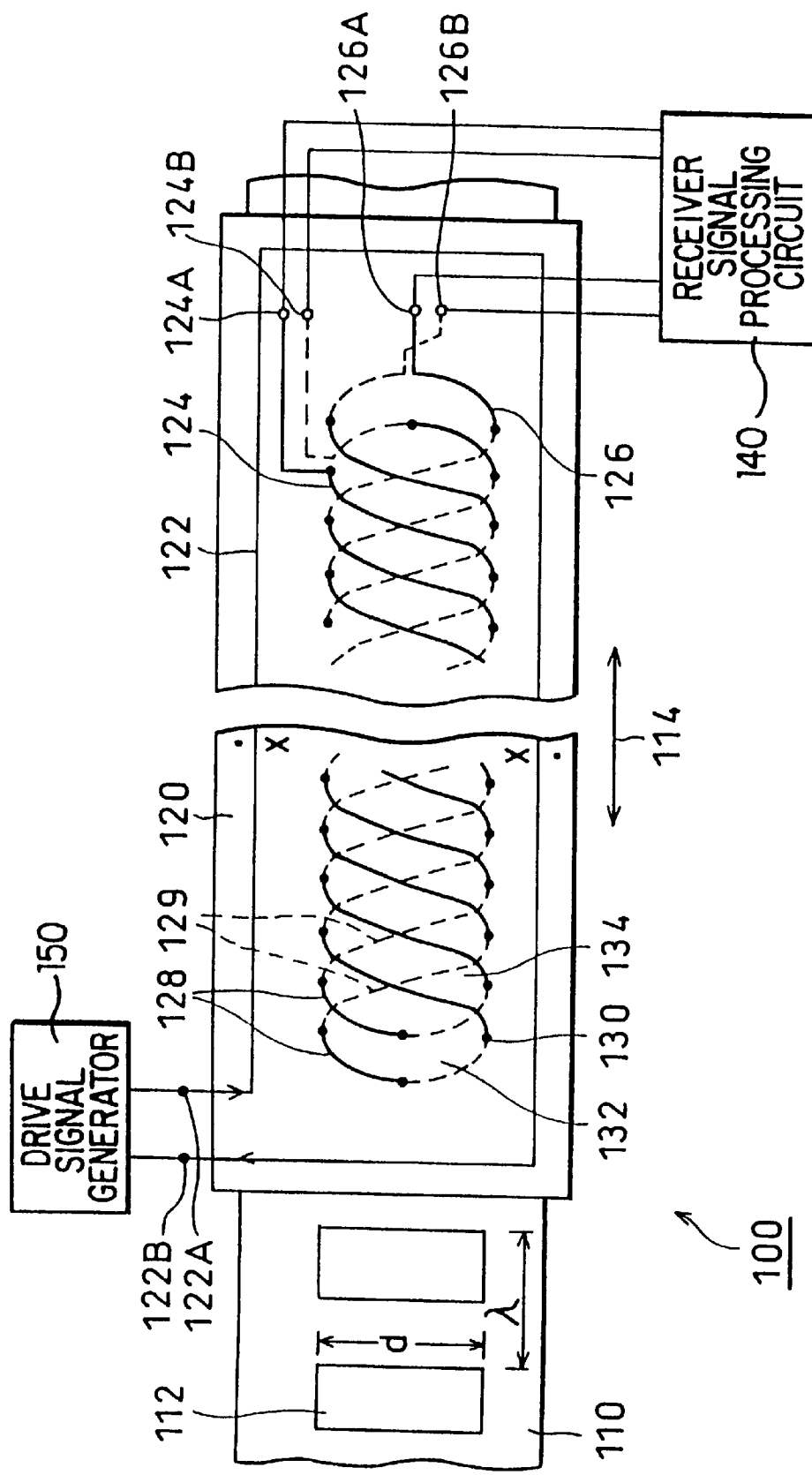
FIG. 1 shows a known induced current position transducer having undesirable extraneous signal offset components.
Figure 2A:
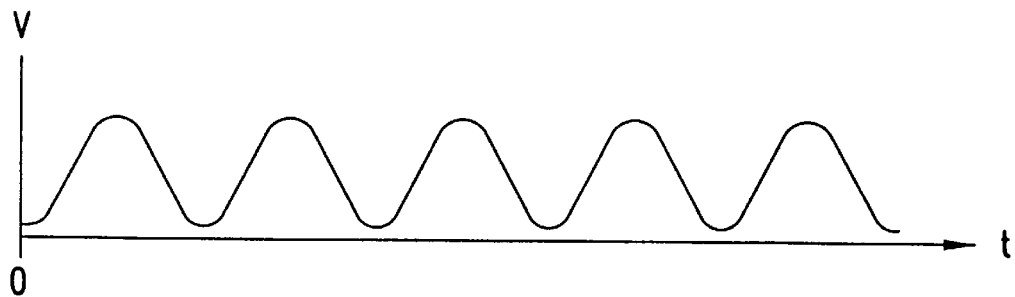
FIG. 2A shows the position-dependent output of the positive polarity loops of FIG. 1.
Figure 2B:
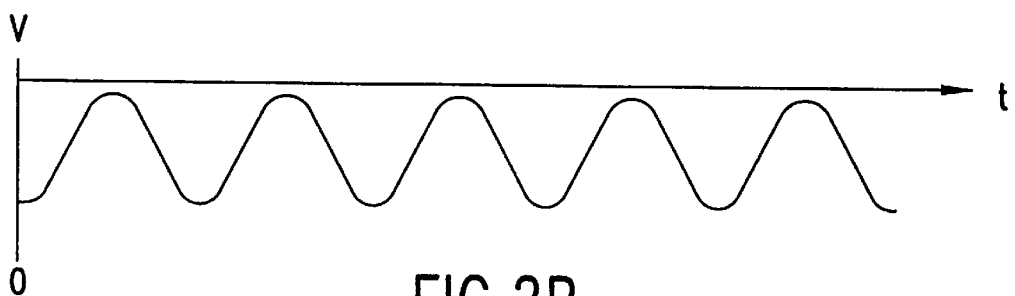
FIG. 2B shows the position-dependent output of the negative polarity loops of FIG. 1.
Figure 2C:
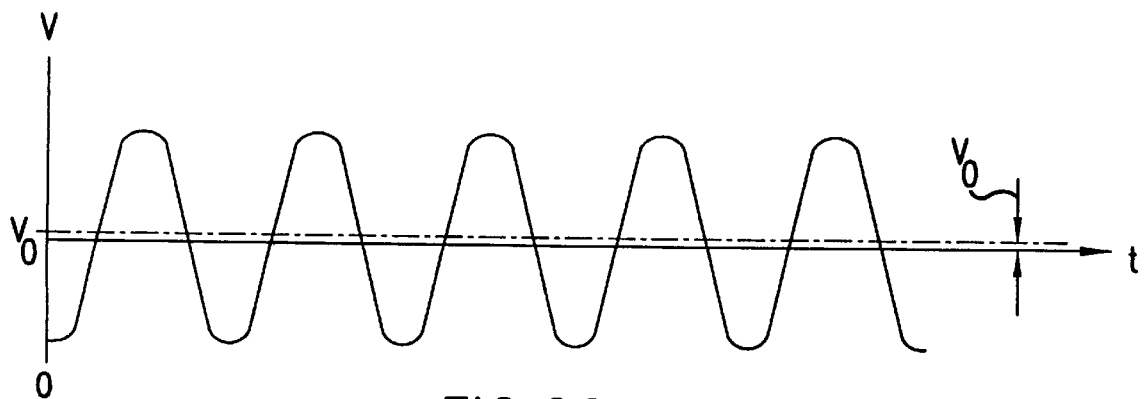
FIG. 2C shows the net position-dependent output of the positive and negative polarity loops of FIG. 1.
Figure 5:
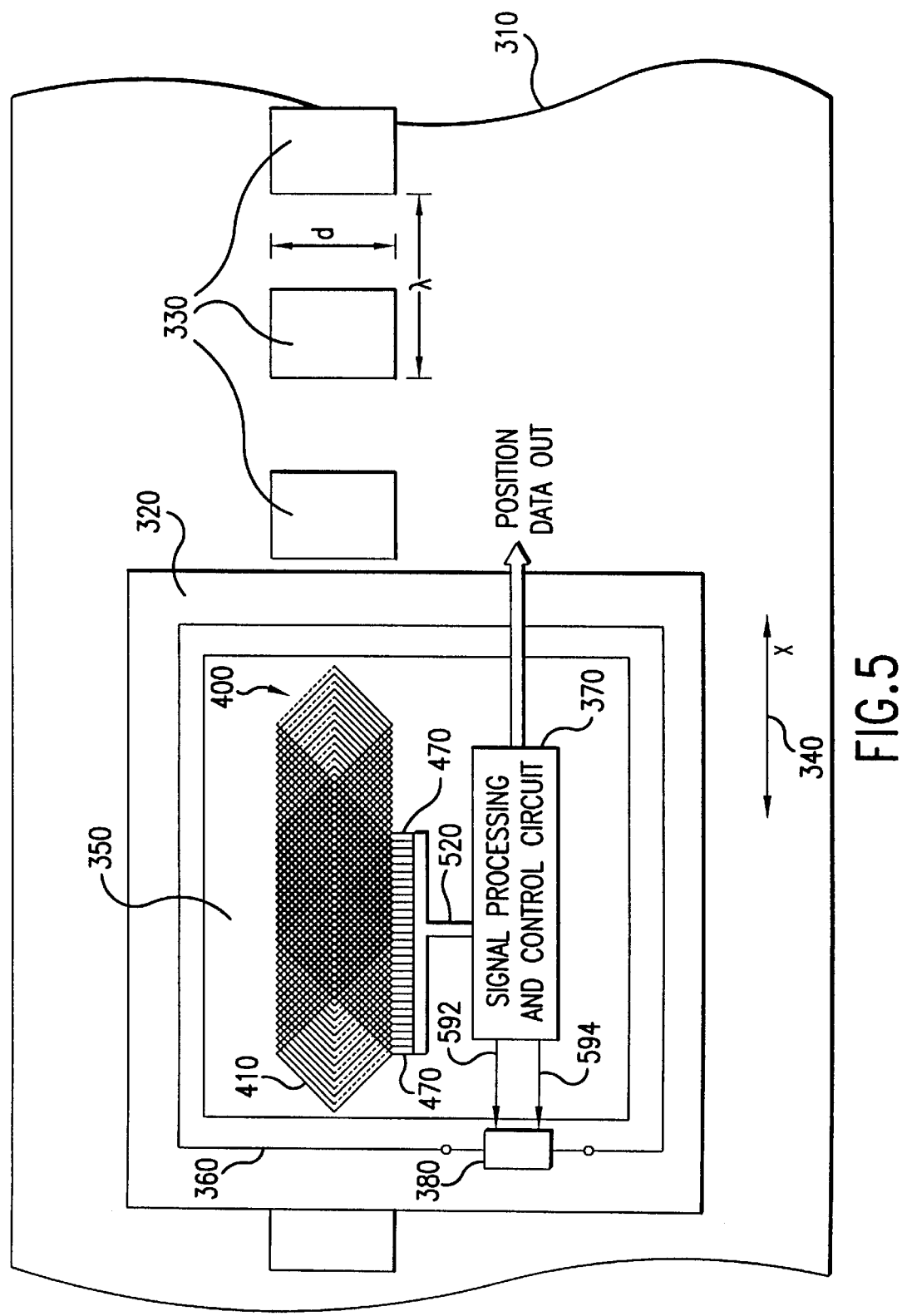
FIG. 5 shows a first preferred embodiment of the multi-tap induced current position transducer of this invention.

FIG. 5 shows a first preferred embodiment of a multi-tap induced current position transducer 100. The multi-tap induced current position transducer 300 comprises a scale member 310 that is movable relative to a read head 320. The scale member 310 is preferably formed on a printed circuit board using standard printed circuit board technology, and the scale member 310 is preferably a planar strip, a circular disk, or a cylinder. When the magnetic flux modulators 330 are provided as flux disrupters, the flux modulators 330 may formed as raised portions of a conductive substrate, i.e., like gear teeth, and the scale 310 may be a gear.

A plurality of magnetic flux modulators 330 are distributed on the scale member 310 along a measuring axis 340 of the multi-tap transducer 300 at a pitch equal to a wavelength $\lambda$. The measuring axis 340 may be linear or circular. The flux modulators 330 have a nominal width along the measuring axis 340 of $\lambda/2$. The flux modulators 330 have a width d in a direction perpendicular to the measuring axis 340.

A sensing unit 350, preferably a silicon integrated circuit chip, is mounted on the read head 320. The read head 320 also includes a transmitter driver circuit 380.

The sensing unit 350 includes a multi-tap receiver winding 400 positioned on the sensing unit 350 within the flux region inside the transmitter winding 360. The multi-tap receiver winding 400 is formed from a plurality of receiver loops 410 that are electrically connected in series to implement a vector phase "circle."

The sensing unit 350 also includes a signal processing and control circuit 370 that processes electrical signals from the multi-tap receiver winding 400. The electrical signals are input to the signal processing and control circuit 370 via the electrical output taps 470 and a bus 520. The signal line 592 and 594 are used to supply control signals from the signal processing and control circuit 370 to the transmitter driver circuit 380.

Figure 6:
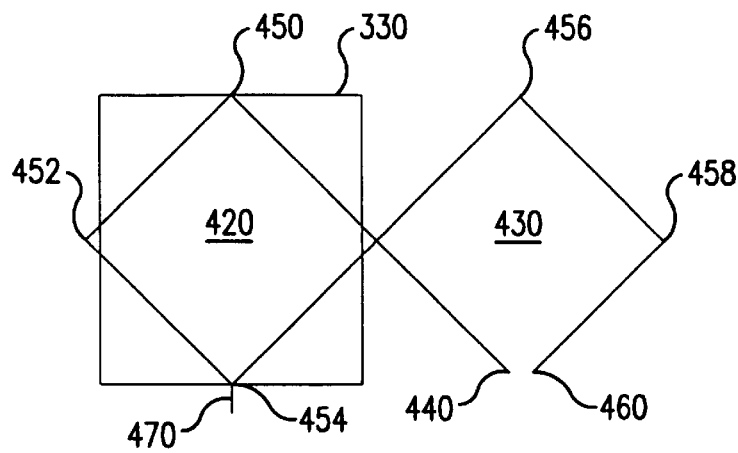
FIG. 6 shows a preferred multi-tap receiver winding loop used in the multi-tap induced current position transducer of this invention.

FIG. 6 shows one of the multi-tap receiver loops 410 that make up the multi-tap receiver winding 400. The basic multi-tap receiver loop 410 comprises two opposite polarity half-loops 420 and 430. The multi-tap receiver loop 410 starts at a start point 440 and is routed on a first layer or surface of the loop substrate in a counterclockwise sense to a via 450. The multi-tap receiver loop 410 passes through the via 450 to a second layer or surface of the substrate and is routed in the counterclockwise sense from the via 450 to a via 452. The multi-tap receiver loop then passes through the via 452 back to the first layer or surface of the substrate and is routed in the counterclockwise sense to a via 454, where the multi-tap receiver loop 410 connects to a tap 470.

The multi-tap receiver loop then passes through the via 454 back to the second layer or surface of the substrate and is routed in the counterclockwise sense until crossing over itself and then in a clockwise sense to a via 456. The multi-tap receiver loop then passes through the via 456 back to the first layer or surface of the substrate and is routed in the clockwise sense to a via 458. The multi-tap receiver loop then passes through the via 458 back to the second layer or surface of the substrate and is routed in the clockwise sense to a via at an end point 460 of the multi-tap winding.

Accordingly, the voltages induced in the two half-loops 420 and 430 by the magnetic field will have opposite polarities. Thus, because the magnetic field generated by the transmitter winding 360 is substantially homogeneous, the resulting voltages over the points 440 and 460 will be zero.

However, the flux modulators 330 have a length along the measuring axis 340 approximately equal to the length of one of the half-loops 420 and 430 along the measuring axis 340. As described above, the flux modulators can be either flux disrupters and/or flux enhancers. When the flux modulators are flux disrupters, the flux modulators 330 preferably comprise copper electrodes positioned on the scale member 310 in a periodic pattern having a period $\lambda$.

The changing magnetic field created by the transmitter winding 360 induces an electrical current in the conductive flux modulators 330. The induced current in the flux modulators 330 creates a magnetic field that counteracts the primary magnetic field created by the transmitter winding 360. The multi-tap receiver loop 410 thus receives a net magnetic flux which is not homogeneous, and the resulting voltages over the points 440 and 460 will be non-zero, with a magnitude and polarity that varies as a function of the position of the multi-tap receiver loop 410 relative to the flux modulator 330.

When the flux modulator 330 is centered under the right half-loop 430, the electrical signal from the full receiver loop 410 will have a maximum amplitude of a first polarity. When the flux modulator 330 is centered under the left half-loop 420, the electrical signal from the full receiver loop 410 will have a maximum amplitude of a second opposite polarity. The distance between the centers of the two half-loops 420 and 430 is preferably equal to half the wavelength of the flux modulator pattern. However, the distance between the centers of the two half-loops 420 and 430 may differ slightly from the preferred value. For example, the distance between centers of the two half-loops in one preferred embodiment is 992 $\mu$m, which, in this one preferred embodiment, is slightly more than half of the 1,920 $\mu$m wavelength of the flux modulator pattern in this one preferred embodiment. Another reason for this is to keep the wires and vias of multiple loops from intersecting with each other.

Figure 7:
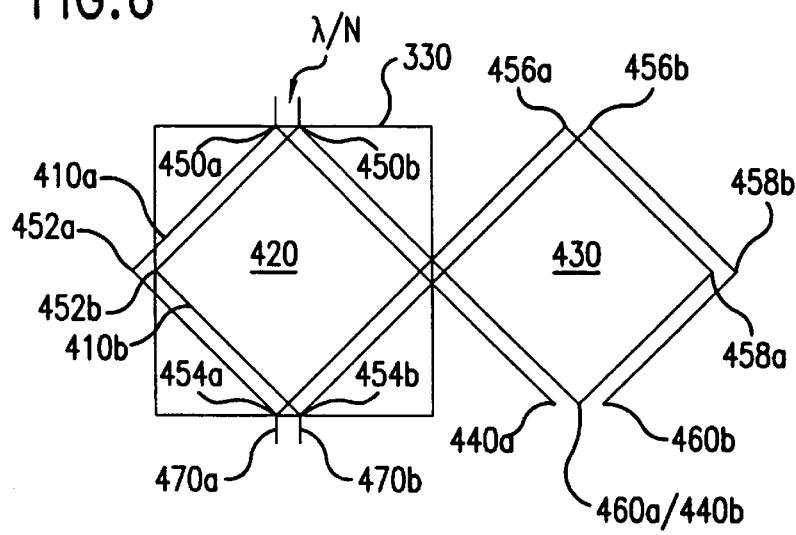
FIG. 7 shows how two of the multi-tap receiver winding loops of FIG. 6 are connected in series.

The plurality of multi-tap receiver loops 410 are connected in series. FIG. 7 shows how two multi-tap receiver loops 410 are connected in series. The first multi-tap receiver loop 410a starts at the start point 440a and is routed in the counterclockwise sense to the via 450a. The first multi-tap receiver loop 410a is then routed in the counterclockwise sense through the vias 452a and 454a to the tap 470a of the first multi-tap receiver loop 410a. The first multi-tap receiver loop 410a is then routed over itself and in the clockwise sense through the vias 456a and 458a to the end point 460a, which is also the series connection to the start point 440b of a second multi-tap receiver loop 410b.

The second multi-tap receiver loop 410b is routed in the counterclockwise sense through the vias 450b, 452b and 454b to the tap 470b of the second multi-tap receiver loop 410b. The second multi-tap receiver loop 410b is then routed across itself and then in the clockwise sense through the vias 456b and 458b to the end point 460b, where it connects to the start point of the next multi-tap receiver loop in the series.

The configuration repeats for all of the multi-tap receiver loops 410. The end point of the last multi-tap receiver loop 410z is connected to the start point 440a of the first multi-tap receiver loop 410a.

If the total number of multi-tap receiver loops 410 is equal to "N", the spacing between individual multi-tap receiver loops 410, e.g., the loop pitch, is preferably equal to $\lambda$/N. The multi-tap receiver winding 400 preferably comprises 30 individual multi-tap receiver loops 410. In the one preferred embodiment discussed above, the wavelength $\lambda$ is 1,920 $\mu$m. Thus, the loop pitch or spacing, between each of the 30 multi-tap receiver windings 410 is 64 $\mu$m in this one preferred embodiment. In this one preferred embodiment, each of the multi-tap receiver loops 410 has a maximum width "d" of approximately 1 mm.

A plurality of electrical output taps 470 are preferably connected to the vias 450 of each of the individual multi-tap receiver loops 410. Thus, a total of 30 electrical output taps 470 are provided at 1 loop pitch intervals beginning with the one-half loop connected to the via 450a. Assigning the first electrical output tap 470 an arbitrary spatial phase designation of 0.5, the 30 electrical output taps 470 correspond to designated phases of 0.5, 1.5, 2.5, . . . 29.5.

Figure 8:
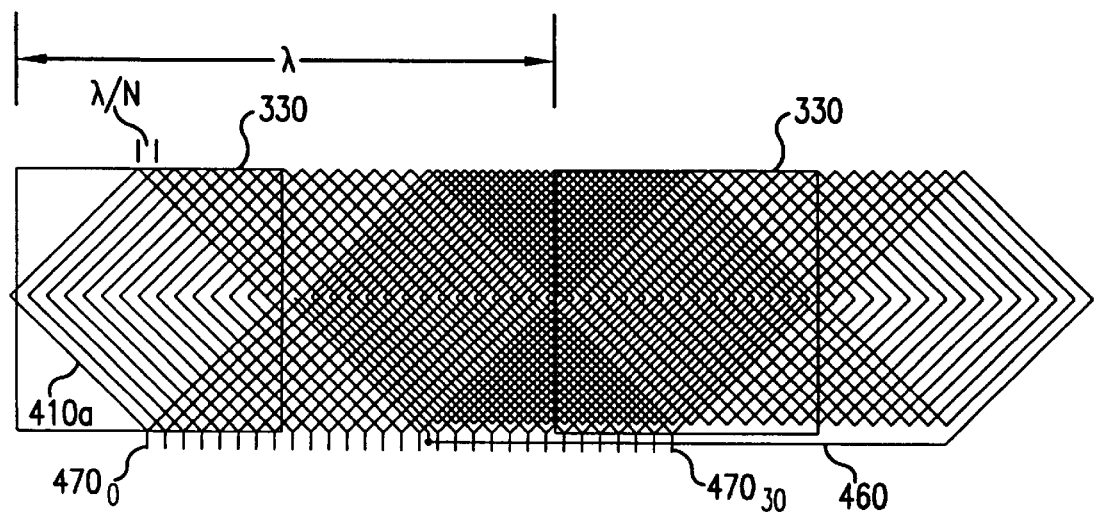
FIG. 8 shows a preferred 30-loop multi-tap receiver winding used in the multi-tap induced current position transducer of this invention.

FIG. 8 shows the full multi-tap receiver winding 400. As shown in FIG. 8, all of the individual multi-tap receiver loops 410 are connected in series, with the end point 460 of the last individual multi-tap receiver loop 410 connected to the start point 440a of the first receiver loop 410. Thus, each of the individual multi-tap receiver loops 410 constitutes a spatially modulated portion, having a defined spatial phase, of the full multi-tap receiver winding 400.

Figure 9:
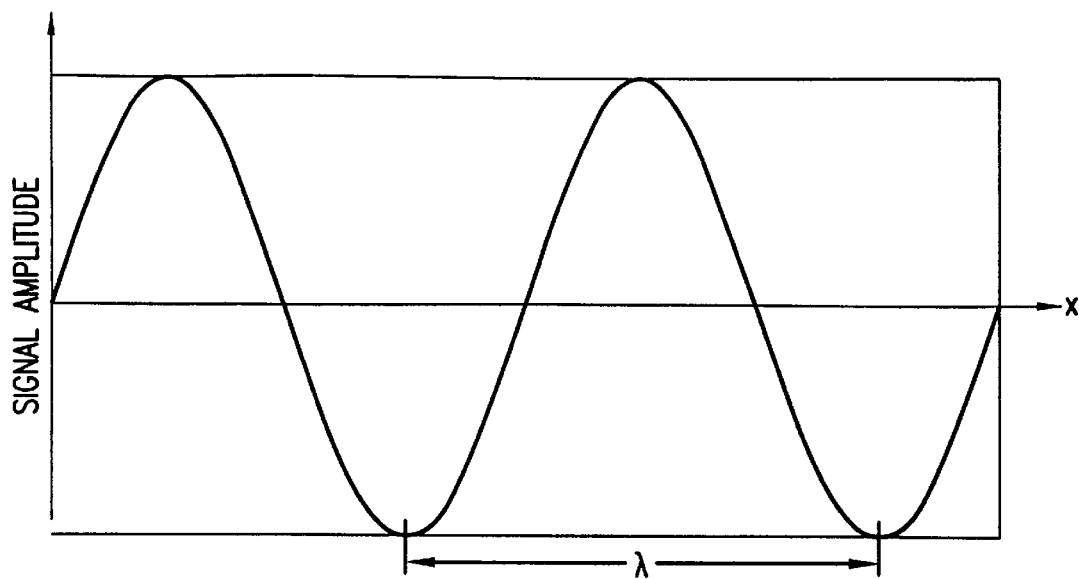
FIG. 9 shows the net position-dependent output of the multi-tap receiver winding loop of FIG. 6.

FIG. 9 shows the amplitude and polarity signal obtained from adjacent ones of the individual multi-tap receiver loop taps 470 as a function of the position of the read head 320 over the scale member 310 along the measuring axis 340, when the transmitter winding 360 is energized with a time-varying electrical signal. The signal amplitude is essentially a sinusoidal function with a period length equal to the wavelength $\lambda$. Experimental results show that for many fabricated devices, this is approximately true even for the diamond-shaped loops shown. If desired, loop modifications can be made to approach a sinusoidal function even more closely.

The induced voltage contributed by the receiver loop in the "nth" spatial phase position, at an arbitrary relative position x between the read head 320 and the scale 310, is closely represented by:

$$V_n = A \cdot \sin 2\pi \cdot \left(\frac{x}{\lambda} + \frac{n}{N}\right), \quad (1)$$

where:

$V_n$ is the induced voltage contribution from the multi-tap receiver loop "n";

A is the amplitude of the sinusoidal function;

N is the total number of multi-tap receiver loops; and x is the position of the read head 320 relative to the scale member 310.

Figure 10:
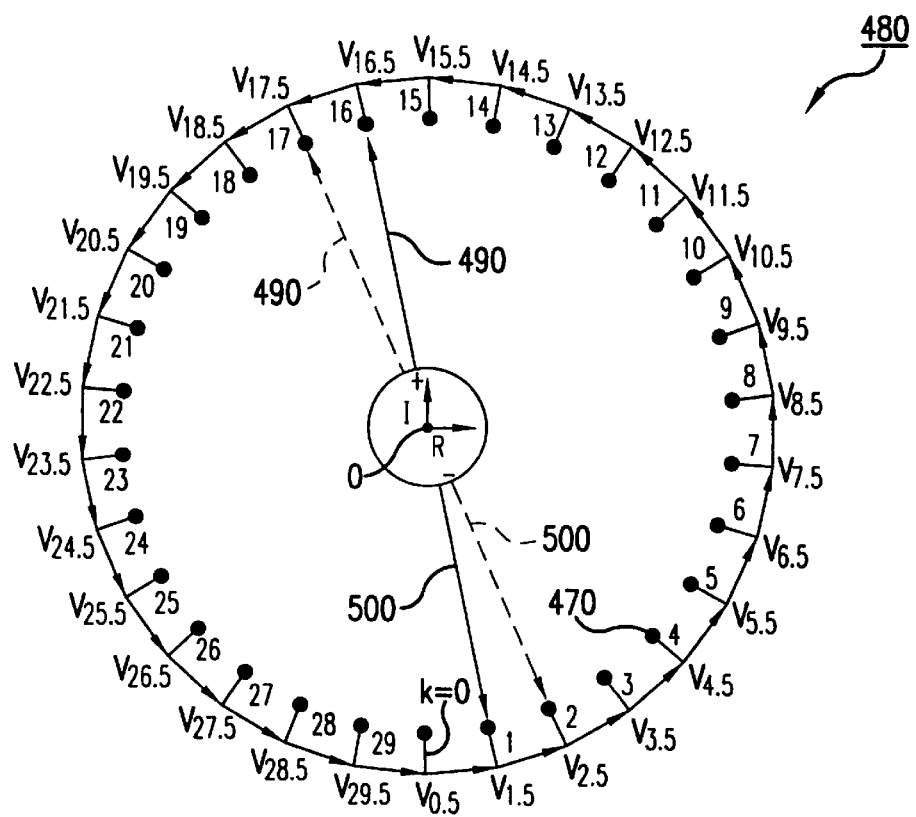
FIG. 10 shows a schematic vector phase diagram for the 30-loop multi-tap receiver winding of FIG. 8.

FIG. 10 is a vector phase diagram useful in analyzing the operation of the multi-tap read head and scale. The vector rotation between adjacent taps of the vector wheel 480 represent the spatial phase angles between adjacent taps 470 on the read head 320. Therefore, the projection of any sum of the vectors of the vector wheel 480 onto the horizontal R, or real, axis of the orthogonal R-I axes represents the signal amplitude between the associated tap points when the scale is in this position. Thus, FIG. 10 shows the summing of the signal vectors from the spatial phases, i.e., phases 0.5–29.5, connected to the 30 electrical output taps 470, i.e., the electrical output taps 0–29. As shown in FIG. 10, any one of the electrical output taps 470 can be opened with no electrical signal across the opened end points. Accordingly, all of the individual multi-tap receiver loops 410 can be connected in series in a vector circle with no current being generated in the total vector circle, regardless of scale position. However, over diametrically opposite electrical output taps $470_x$ and $470_{(x+15)}$, an electrical signal is present that is the vector sum of all the vectors in either half of the vector circle 480.

The vector contribution of each of the multi-tap receiver loops 410 provided at the corresponding taps 0–29 to a voltage $V_k$ output between the diametrically opposite taps $470_x$ and $470_{(x+15)}$ depends upon the relative location of the selected taps 470 and the scale elements 330. In the vector circle 480 shown in FIG. 10, the relative location of the selected taps 470 to the scale elements 330 is shown by the relative angular rotation of the vector wheel 480 to the R axis. Thus, when a scale element 330 is centered on the tap x, the vector wheel 480 must be rotated so that the tap x is located directly at the bottom of the vector wheel 480. When the scale elements 330 move relative to the taps 470, the vector circle 480 rotates relative to the R axis a corresponding amount about a common rotation axis O.

Thus, the relative position of the vector wheel to the R-I axis shown in FIG. 10 corresponds to the example shown in FIG. 8, where the scale element 330 is centered on the tap $470_0$. Furthermore, as the scale element 330 moves towards the tap $470_{30}$, the vector wheel rotates clockwise around the R axis about the common axis O.

Eq. 2 describes this behavior of the vector wheel 480 in mathematical terms, where the voltage $V_k$ output to the signal processing and control circuit 370 is represented by:

$$V_k = \sum_{m=k}^{m=k+(N/2)} V_m = C \cdot A \cdot \mathrm{Sin} 2\pi \cdot \left(\frac{x}{\lambda} + \frac{k}{N}\right), \quad (2)$$

where:

$V_k$ is the voltage detected when the signal processing and control circuit 370 is connected to the electrical output tap $470_k$ and electrical output tap $470_{(k+(N/2))}$;

C is a constant that depends on the number of receiver loops within a wavelength;

A is the amplitude of the sinusoidal function;

N is the total number of multi-tap receiver loops; and x is the position of the read head 320 relative to the scale member 310.

The voltage $V_k$ is a sinusoidal function of the position of the read head 320 relative to the scale member 310. In the example shown, the amplitude of the sinusoidally-varying (with position)voltage $V_k$, and thus the constant C, is approximately ten times the amplitude A of the voltage contribution for an individual multi-tap receiver loop 410. The spatial phase angle term of Equation (2) (which determines the effective amplitude of the voltage $V_k$) is directly related to the positions of the connected electrical output taps 470 along the vector circle 480 and the angle relative to the R-I axis which corresponds to the relative position of the loops and scale. The signal processing and control circuit 370 is connected to the electrical output tap $470_k$ and the electrical output tap $470_{(k+(N/2))}$. When (k+N/2) is greater than "N", electrical output tap $470_{(k+(N/2))}$ is actually the electrical output tap $470_{(k-(N/2))}$.

When the two electrical connections 490 and 500 are moved in tandem over the electrical output taps 470, "N" different spatial phase positions are available. In the preferred multi-tap receiver winding 400, 30 individual receiver loops 410 are used, i.e., "N" is equal to 30. Accordingly, 30 different phase positions are available. However, it should be appreciated that additional electrical output taps 470 can be used to obtain additional phase positions. For example, electrical output taps 470 can be placed at half-loop intervals (i.e., the start/end points 440/460) for a total of 60 electrical output taps, for the same 30-loop multi-tap receiver winding 400. In this case, there are 60 digitally-selectable phase positions. Like the individual receiver loops 410, the electrical output taps 470 have a defined spatial phase corresponding to their relation to the receiver loops 410.

Alternatively, the electrical connections 490 and 500 can be moved one at a time to increase the available number of digital phase positions, i.e., not in tandem. In this case, as each electrical connection 490 and 500 is moved independently while the other electrical connection 500 or 490 remains stationary, 60 digitally-selectable phase positions are available. These are the original 30 different phase position steps and 30 additional phase positions one-half step away. The half-steps are achieved when the first one of the electrical connections 490 and 500 has moved one step, but the other of the first and second electrical connections 500 and 490 has not moved.

Figure 11:
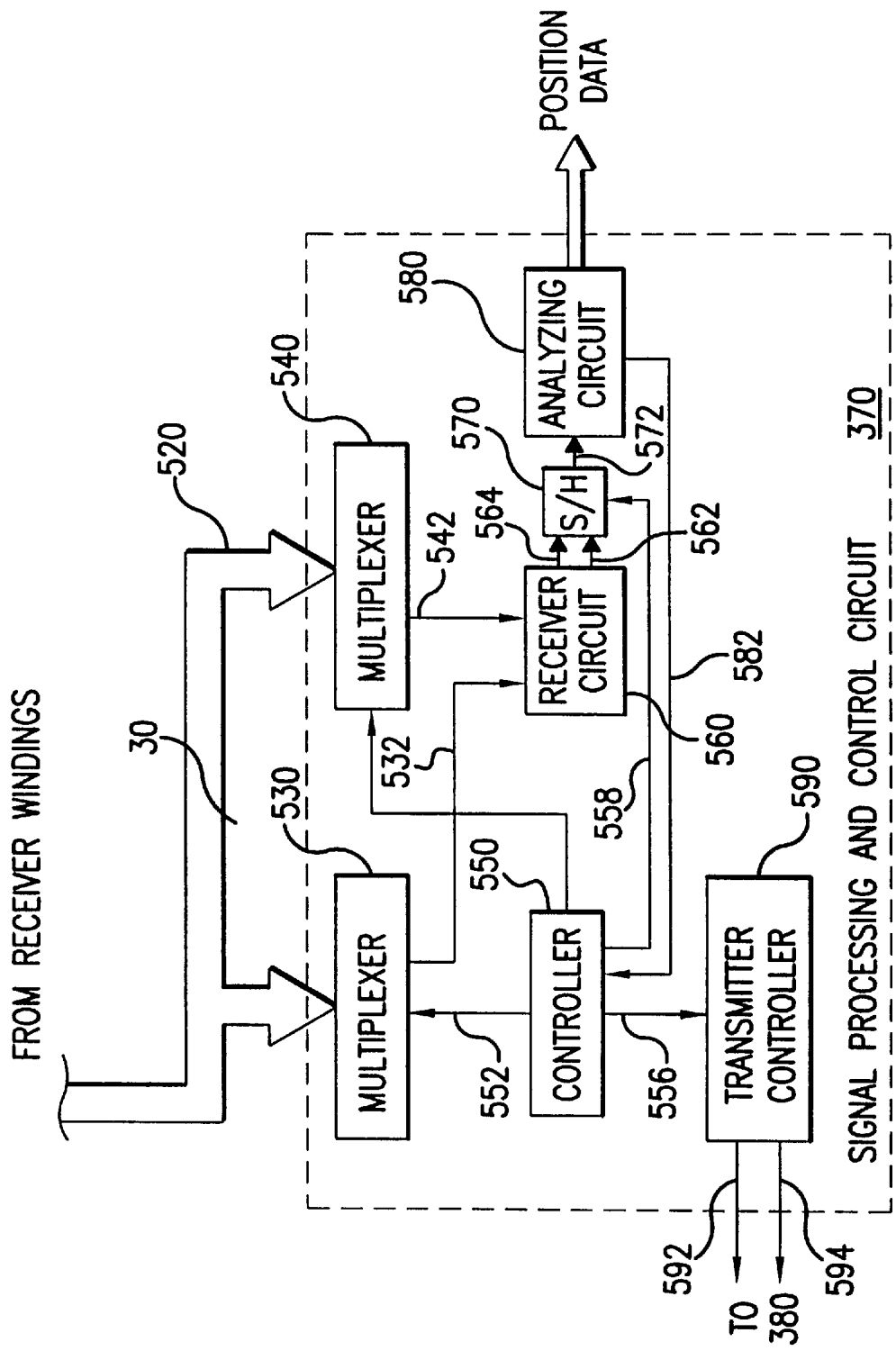
FIG. 11 is a block diagram of the transducer electronics shown in FIG. 5.

FIG. 11 shows the signal processing and control circuit 370 in more detail. The signal processing and control circuit 370 comprises multiplexers 530 and 540, a controller 540, a receiver circuit 560, a sample and hold circuit 570, an analyzing circuit 580 and a transmitter controller 590.

The bus 520 connects each electrical output tap 470 to the multiplexers 530 and 540. The multiplexers 530 and 540 implement the electrical connections 490 and 500 discussed above in connection with FIG. 10.

The multiplexers 530 and 540 send signals to the receiver circuit 560 via the signal lines 532 and 542, respectively. The receiver circuit 560 sends signals to the sample and hold circuit 570 via signal lines 562 and 564. The sample and hold circuit 570 sends signals to the analyzing circuit 580 via a signal line 572. The controller 550 sends control signals to the multiplexers 530 and 540, the transmitter controller 590 and the sample and hold circuit 570 via the control lines 552, 554, 556 and 558, respectively. The analyzing circuit 580 sends control signals to the controller 550 via a control line 582. In addition, the transmitter controller sends control signals to the transmitter driver circuit 380 via the control lines 592 and 594.

It should also be appreciated that, with slight modification, the signal processing and control circuit can be used to operate the multi-tap transducer in reverse. That is, the multi-tap receiver winding 400 can be used as a multi-tap transmitter winding and the transmitter winding 360 can be used as a receiver winding.

Figure 12:
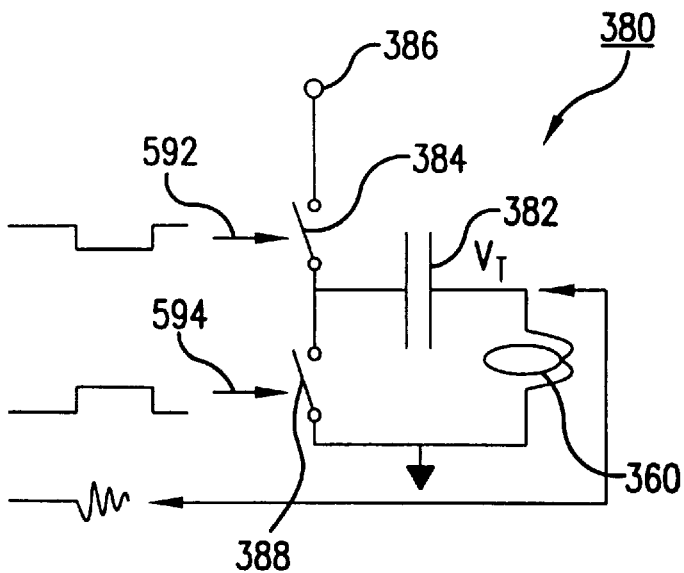
FIG. 12 shows a schematic diagram of the transmitter circuit shown in FIG. 5.
Figure 13:
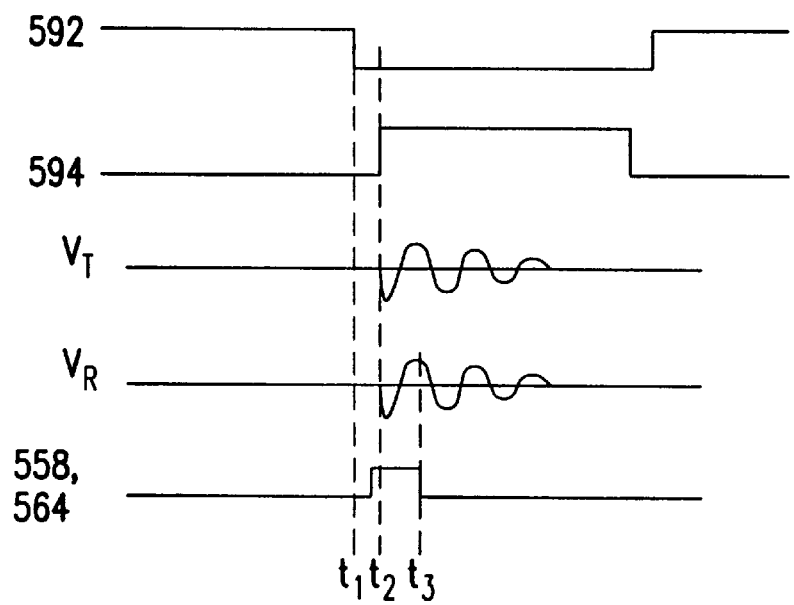
FIG. 13 is a timing diagram for the transmitter circuit of FIG. 12.

FIGS. 12 and 13 show the operation of the transmitter driver circuit 380. The transmitter winding 360 is connected in series with a capacitor 382. A switch 384 connects the other end of the capacitor 382 to a voltage source 386 for charging the capacitor 382 to a voltage $V_c$ in the time interval between transmitter pulses. A switch 388 connects the capacitor 382 and the transmitter winding 360 in series when the switch 388 is closed.

As shown in the timing diagram of FIG. 13, at time $t_1$ a control signal on the signal line 592 from the transmitter controller 590 goes low, causing the switch 384 to open. Thus, the capacitor 382 is disconnected from the voltage source 386. Next, at time $t_2$, a control signal on the signal line 594 from the transmitter controller 659 goes high, causing the switch 388 to close and connect the capacitor 382 and the transmitter winding 360 in a parallel configuration.

The transmitter winding 360 and the capacitor 382 form a resonant circuit. Thus, the amplitude of the voltage $V_t$ in the transmitter winding 360 undergoes a damped oscillation, as shown in FIG. 13. The damped oscillation signal $V_t$ in the transmitter winding 360 is inductively coupled to the multi-tap receiver winding 400, which generates a receiver signal $V_R$.

The controller 550 sends a control signal over the signal line 558 to the sample and hold circuit 570. The control signal on the signal line 558 triggers the sample and hold circuit 570 to store the value of the signal $V_R$ at time $t_3$. Related circuit techniques and signal processing applicable to this invention are also described in U.S. patent application Ser. No. 08/441,769, filed May 16, 1995, and incorporated herein in its entirety, and U.S. patent application Ser. No. 08/645,483, filed May 13, 1996, and incorporated herein in its entirety.

In the reverse case, the signal generating and processing circuit is modified so that the transmitter driver circuit 380 is connected between the transmitter controller 590 and the first and second multiplexers 530 and 540. In particular, the capacitor 382 and the switch 388 are connected to the signal lines 532 and 542, respectively, so that the first and second multiplexers 530 and 540 can selectively connect the capacitor 382 and the switch 388 to the taps 470 of the multi-tap transmitter winding 400. At the same time, the inputs to the receiver circuit 560 are connected to the ends of the receiver winding 360.

Figure 14:
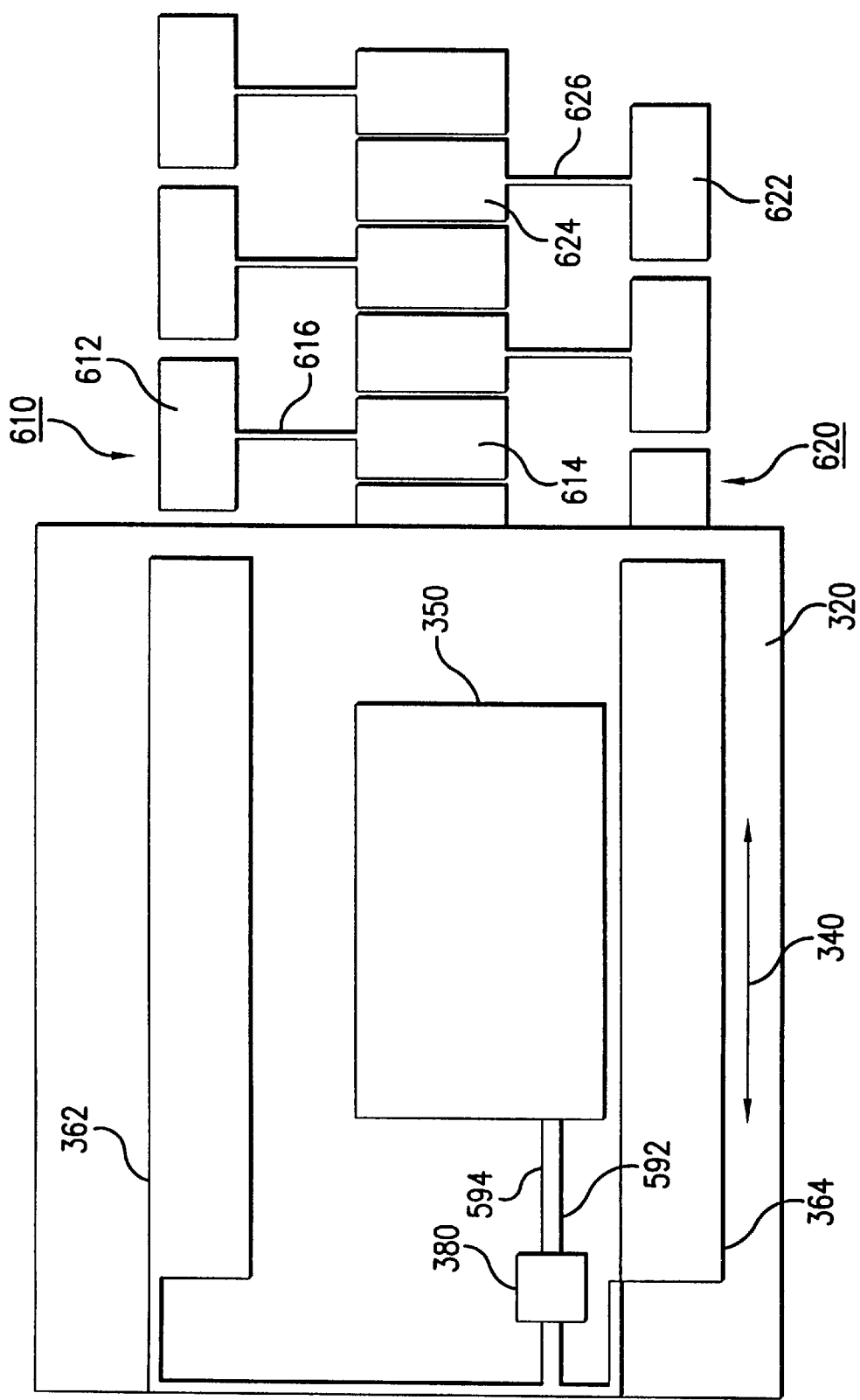
FIG. 14 shows a second preferred embodiment of the multi-tap induced current position transducer of this invention using the design principles of the reduced offset induced current position transducer shown in FIG. 4.

FIG. 14 shows a second preferred embodiment of the multi-tap induced current position transducer of this invention. The multi-tap transducer 600 is a "reduced offset" type and operates in a substantially similar manner to the "reduced offset" transducer discussed above. In addition, the operation of the sensing unit 350, including the multi-tap receiver winding 400 (not shown), and the transmitter driver circuit 380 is the same as discussed above in connection with the embodiment of the multi-tap transducer shown in FIG. 5.

In the reduced offset transducer 600, the transmitter winding includes a first transmitter winding 362 and a second transmitter winding 364. The first and second transmitter windings 362 and 364 extend along the measuring axis 340 and are positioned on opposite sides of the multi-tap receiver winding 400.

The scale member 310 has a plurality of first coupling loops 610 extending along the measuring axis 340 and interleaved with a plurality of second coupling loops 620 also extending along the measuring axis 340. Each first coupling loop 610 has a first portion 612 aligned with the first transmitter winding 362 and a second portion 614 aligned with the multi-tap receiver winding 400. Similarly, each second coupling loop 620 has a first portion 622 aligned with the second transmitter winding 364 and a second portion 624 aligned with the multi-tap receiver winding 400.

The first loop portions 612 are connected to the second loop portions 614 by connecting conductors 616. Similarly, the first loop portions 622 are connected to the second loop portions 624 by connecting conductors 626. The second loop portions 614 and 624 each have a length along the measuring axis 340 that is slightly less than one-half the length of a multi-tap receiver loop 410 (not shown). In addition, the second loop portions 614 and the second loop portions 624 are each preferably arranged at a pitch of $\lambda$.

In operation, currents flow in the transmitter windings 362 and 364 in opposite directions. Thus, currents having opposite direction are induced in the coupling loop portions 612 and 622. The currents in the loop portions 612 and 622 are coupled to the loop portions 614 and 624 by the connecting conductors 616 and 626, respectively.

The current coupled to the second loop portions 614 and 624 generates magnetic fields of opposite polarity that, in turn, induce currents in the multi-tap receiver winding loops 410, as described above. The opposite polarity second loop portions 614 and 624 result in an enhanced multi-tap receiver winding signal.

Figure 15:
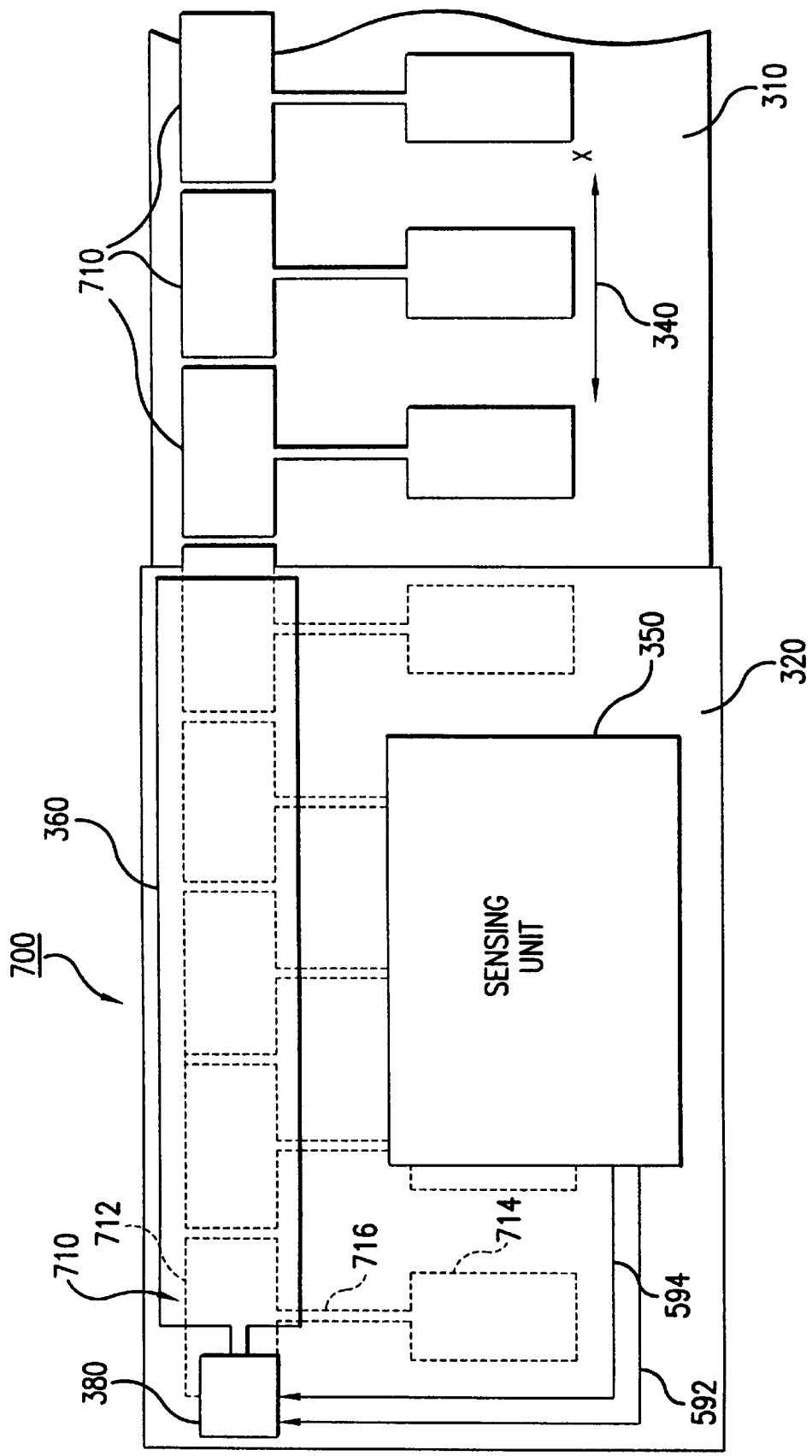
FIG. 15 shows a third preferred embodiment of the multi-tap induced current position transducer of this invention.

FIG. 15 shows a third preferred embodiment of the multi-tap induced current position transducer of this invention. The multi-tap transducer 700 is also a reduced offset type and operates in a substantially similar manner to the reduced offset transducer discussed above. In addition, the operation of the sensing unit 350, including the multi-tap receiver winding 400 (not shown), and the transmitter driver circuit 380 is the same as discussed above in connection with the embodiment of the multi-tap transducer shown in FIG. 5.

In the reduced offset transducer 700, the transmitter winding 360 is positioned externally to the sensing unit 350. The scale member 310 has a plurality of coupling loops 710 extending along the measuring axis 340. Each coupling loop 710 has a first portion 712 aligned with the transmitter winding 360 and a second portion 714 aligned with the multi-tap receiver winding 400 in the sensing unit 350. The first loop portions 712 and the second loop portions 714 are connected by connecting conductors 716. The second loop portions 714 are preferably spaced at a pitch equal to the wavelength $\lambda$.

In operation, the transmitter winding 360 generates a primary magnetic field that rises up out of the plane of FIG. 15 inside the transmitter winding 360 and descends into the plane of FIG. 15 outside the loop formed by the transmitter winding 360. In response, a current is induced in the coupling loop portions 712 positioned adjacent the transmitter winding 360. The induced current in each of these coupling loop portions 712 is coupled to their second loop portions 714 by the connecting conductors 716. The currents in the second loop portions 714 generate a magnetic field that, in turn, induces a current in the multi-tap receiver winding loops 410, as described above. Alternatively to the embodiment shown in FIG. 15, with suitable electrical connections, the transmitter loop 360 and transmitter driver circuit 380 can be positioned on a different member than the sensing unit 350, provided that the transmitter loop 360 is placed in an operable position relative to the first coupling loop portions 712 and the sensing unit 350.

Figure 16:
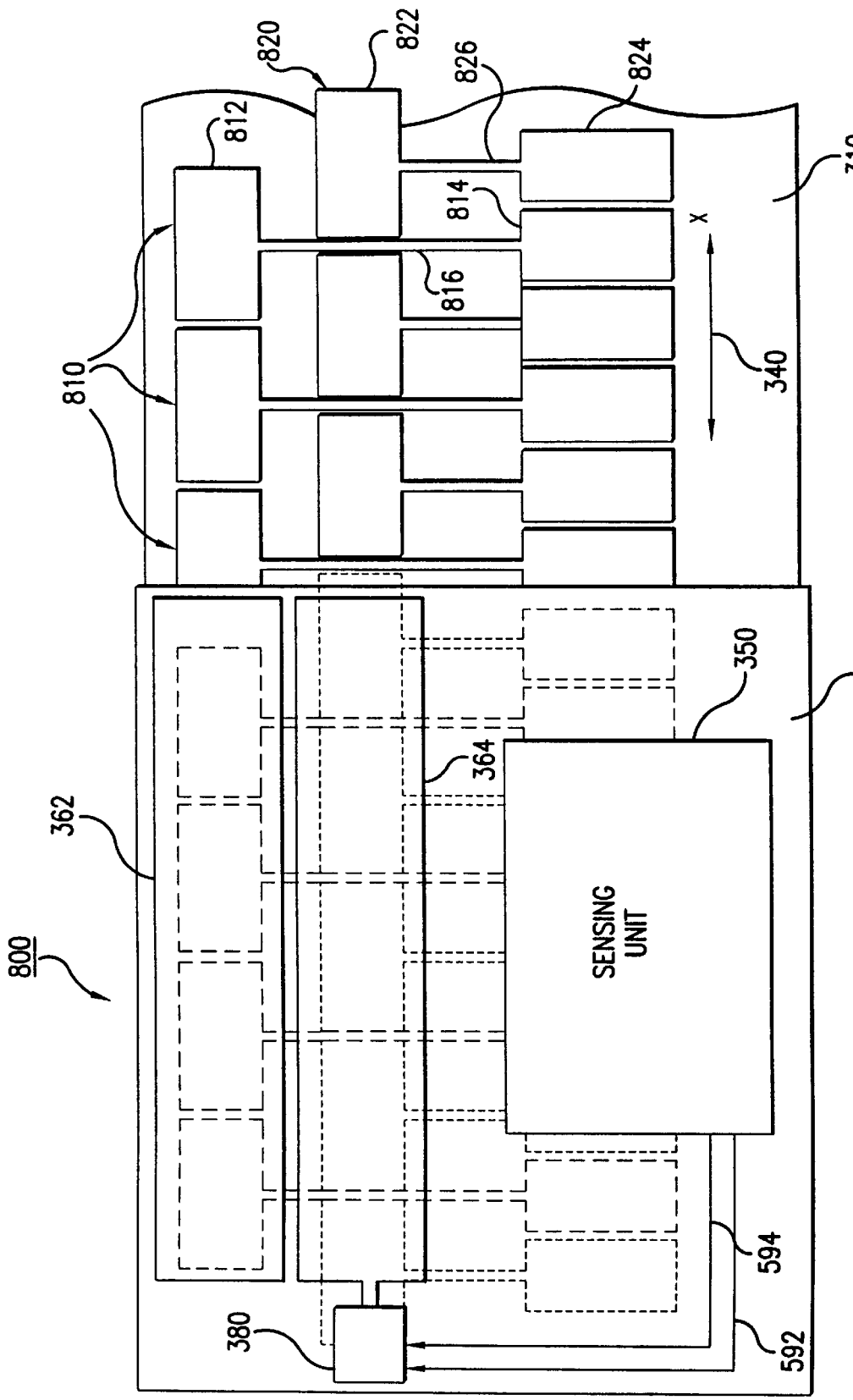
FIG. 16 shows a fourth preferred embodiment of the multi-tap induced current position transducer of this invention.

FIG. 16 shows a fourth preferred embodiment of the multi-tap induced position transducer of this invention. The transducer 800 shown in FIG. 16 is also a reduced offset type and operates in a substantially similar manner to the reduced offset transducers discussed with respect to FIGS. 3 and 4. In addition, the operation of the sensing unit 350, including the multi-tap receiver winding 400 (not shown), and the transmitter driver circuit 380 is the same as discussed above in connection with the embodiment of the multi-tap transducer shown in FIG. 5.

In the reduced offset transducer 800, the transmitter winding also includes a first transmitter winding 362 and a second transmitter winding 364. The first and second transmitter windings 362 and 364 extend along the measuring axis 340 and are positioned on one side of the multi-tap receiver winding 400.

The scale member 310 has a plurality of first coupling loops 810 extending along the measuring axis 340 and interleaved with a plurality of second coupling loops 820 also extending along the measuring axis 340. Each first coupling loop 810 has a first portion 812 aligned with the first transmitter winding 362 and a second portion 814 aligned with the multi-tap receiver winding 400. Similarly, each second coupling loop 820 has a first portion 822 aligned with the second transmitter winding 364 and a second portion 824 aligned with the multi-tap receiver winding 400.

The first loop portions 812 are connected to the second loop portions 814 by connecting conductors 816. Similarly, the first loop portions 822 are connected to the second loop portions 824 by connecting conductors 826. The second loop portions 814 and 824 each have a length along the measuring axis 340 that is slight less than one-half the length of a multi-tap receiver loop 410 (not shown). In addition, the second loop portions 814 and the second loop portions 824 are each preferably arranged at a pitch of λ.

In operation, currents flow in the transmitter windings 362 and 364 in opposite directions. Thus, currents having opposite direction are induced in the coupling loop portions 812 and 822. The currents in the loop portions 812 and 822 are coupled to the loop portions 814 and 824 by the connecting conductors 816 and 826, respectively.

The current coupled to the second loop portions 814 and 824 generates magnetic fields of opposite polarity that, in turn, induce currents in the multi-tap receiver winding loops 410, as described above. The opposite polarity second loop portions 814 and 824 result in an enhanced multi-tap receiver winding signal.

Figure 17:
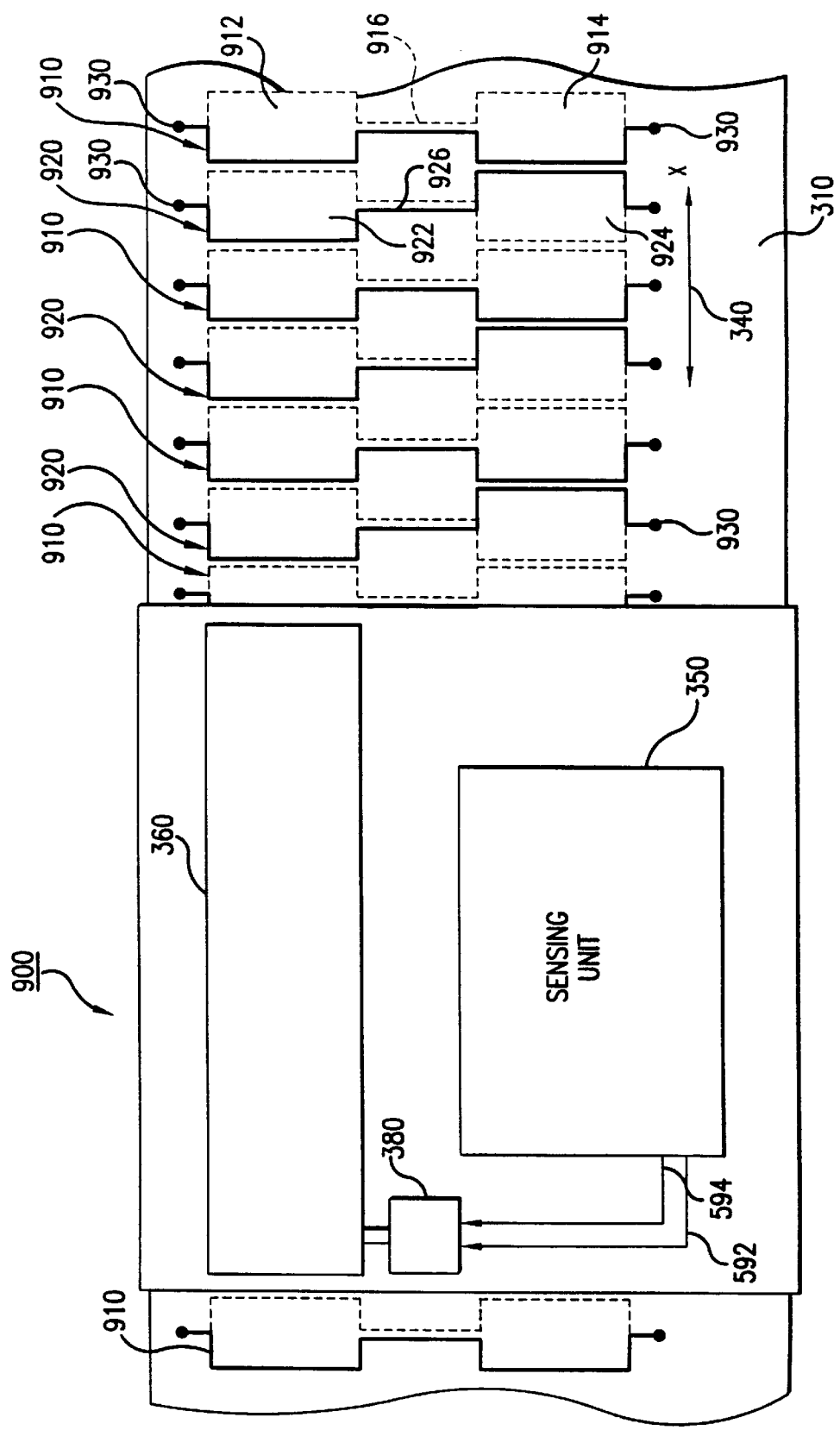
FIG. 17 shows a fifth preferred embodiment of the multi-tap induced current position transducer of this invention.

FIG. 17 shows a fifth preferred embodiment of the multi-tap induced position transducer of this invention. The transducer 900 shown in FIG. 17 is also a reduced offset type and operates in a substantially similar manner to the "reduced offset" transducers discussed above. In addition, the operation of the sensing unit 350, including the multi-tap receiver winding 400 (not shown), and the transmitter driver circuit 380 is the same as discussed above in connection with the embodiment of the multi-tap transducer shown in FIG. 5.

In the reduced offset transducer 900, the transmitter winding 360 is positioned external to the sensing unit 350 and extends along the measuring axis 340.

The scale member 310 has a plurality of first coupling loops 910 extending along the measuring axis 340 and interleaved with a plurality of second coupling loops 920 also extending along the measuring axis 340. Each first coupling loop 910 has a first portion 912 aligned with the transmitter winding 360 and a second portion 914 aligned with the multi-tap receiver winding 400. Similarly, each second coupling loop 920 has a first portion 922 aligned with the transmitter winding 360 and a second portion 924 aligned with the multi-tap receiver winding 400.

The coupling loops 910 and 920 are formed on a two-layer scale member 310 with vias 930 between the two layers. The solid lines represent the portions of the coupling loops 910 and 920 that are positioned on the first layer, while the dashed lines represent the portions of the coupling loops 910 and 920 that are positioned on the second layer.

The first loop portions 912 are connected to the second loop portions 914 by connecting portions 916. Similarly, the first loop portions 922 are connected to the second loop portions 924 by connecting portions 926. Thus, currents induced in first loop portions 912 and 922, via the magnetic field generated by the transmitter winding 360, will be coupled to second loop portions 914 and 924.

In the coupling loops 920, the connecting portions 926 are twisted. Thus, the currents in the first and second loop portions 922 and 924 will flow in opposite directions. In contrast, in the coupling loops 910, the connecting portions 914 are not twisted. Thus, the currents in the first and second loop portions 912 and 914 will flow in the same direction. The second loop portions 914 and 924 each have a length along the measuring axis 340 that is slight less than one-half the length of a multi-tap receiver loop 410 (not shown). In addition, the second loop portions 914 and the second loop portions 924 are each preferably arranged at a pitch of λ.

The current coupled to the second loop portions 914 and 924 generates magnetic fields of opposite polarity that, in turn, induce currents in the multi-tap receiver winding loops 410, as described above. The opposite polarity second loop portions 914 and 924 result in an enhanced multi-tap receiver winding signal.

Figure 18:
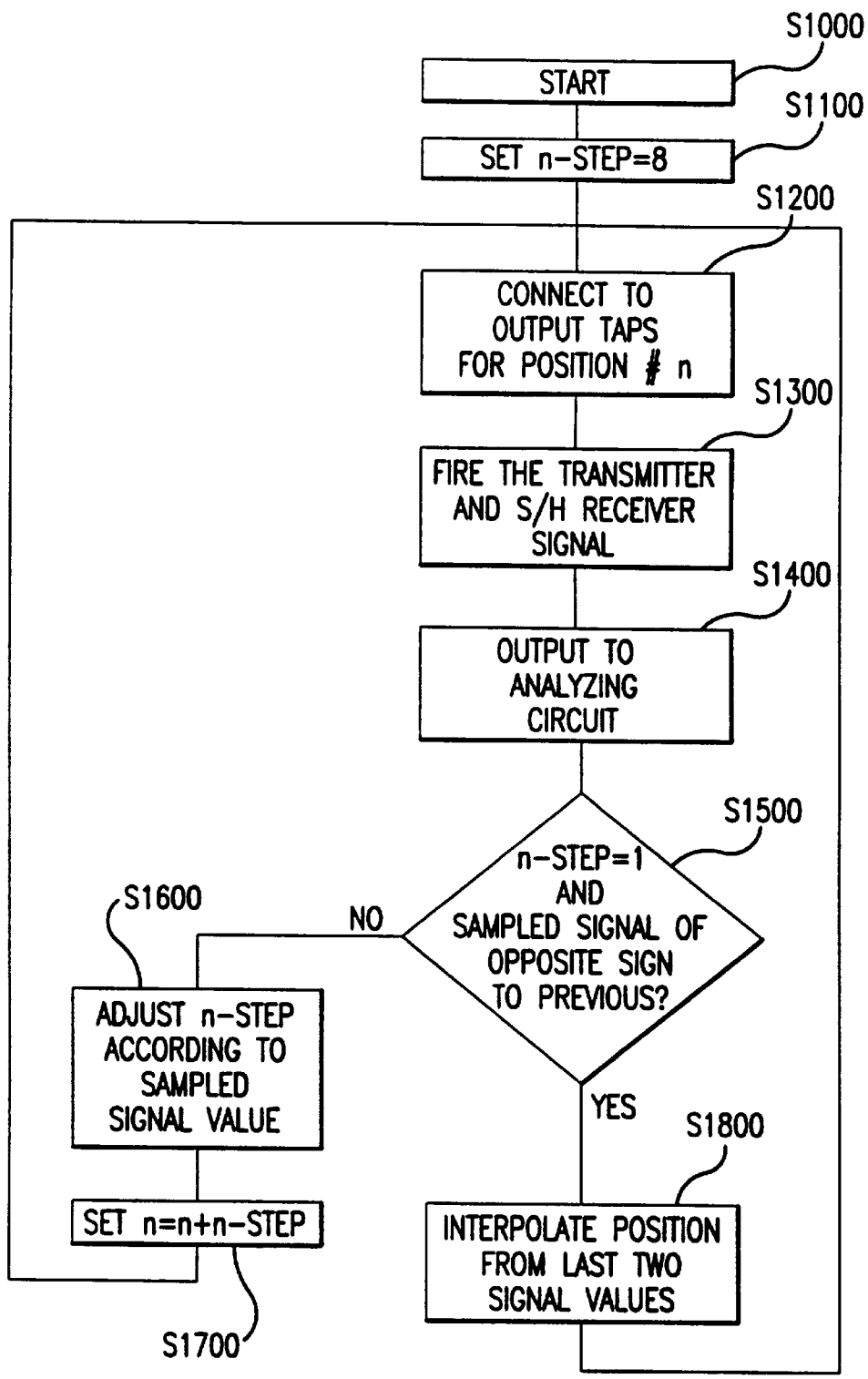
FIG. 18 shows a preferred control routine for the multi-tap induced current position transducer of this invention.

FIG. 18 shows a preferred control routine for the signal processing and control circuit 370. The routine starts at step S1000 and continues to step S1100, where the control system sets the value of the variable "n-step" to 8. Control then continues to step S1200, where the controller 550 controls the multiplexers 530 and 540 to connect the receiver circuit 560 to diametrically opposite electrical output taps 470 at an arbitrary position "n".

Next, at step S1300, the transmitter controller 590 and transmitter driver circuit 380 fires the transmitter winding 360. The sample and hold circuit 570 captures a receiver signal at a first peak in the damped oscillation of the transmitter winding 360.

Control then continues to step S1400, where the receiver signal captured by the sample and hold circuit 570, i.e., the "sampled" signal, is output to the analyzing circuit 580. Next, at step S1500, the control system determines if "n-step" is equal to 1 and whether the sampled signal sent to the analyzing circuit 580 at step S1400 has an opposite polarity relative to the previously sampled signal sent to the analyzing circuit 580. If "n-step" is not equal to 1 and the sampled signal is of opposite polarity relative to the previous sample signal, control continues to step S1600. Otherwise, control jumps to step S1800.

At step S1700, the analyzing circuit 580 adjusts the value of "n-step" based on the amplitude of the sampled signal from the sample and hold circuit 570. If the sampled signal saturates an A/D converter (not shown) in the analyzing circuit 580, the analyzing circuit 580 sets the value of "n-step" to approximately ¼ wavelength, e.g., eight electrical output tap steps in a 30-step vector circle. The analyzing circuit 580 sets the polarity of "n-step" in accordance with the polarity of the sampled signal. For a sampled signal of positive polarity, the analyzing circuit 580 sets the polarity of "n-step" to a first predetermined polarity. For a sampled signal of negative polarity, the analyzing circuit 580 sets the polarity of "n-step" to an opposite direction.

Each time the sampled signal changes polarity with respect to the last measurement, the analyzing circuit 580 divides the value of "n-step" in half and changes its polarity. Thus, the control system will converge to a step size, i.e., "n-step", of 1 within about four transmission and measuring cycles.

After the value of "n-step" is adjusted at step S1600, control continues to step S1700. At step S1700, the analyzing circuit 580 adds the value of "n-step" to "n". Control then returns to step S1200 and the control routine repeats.

At step S1800, the analyzing circuit 580 interpolates the transducer position from the last two sampled signal values. The last two sampled signal values are of opposite sign and emanate from electrical output tap positions that are no farther than one step-unit from the transducer position that would give a zero amplitude output signal, as described above with respect to FIG. 10. That is when the scale elements are centered over one of the connected taps 470. Since the scale elements are most often centered between tap points, the following processing, shown in FIG. 19, is used.

Figure 19:
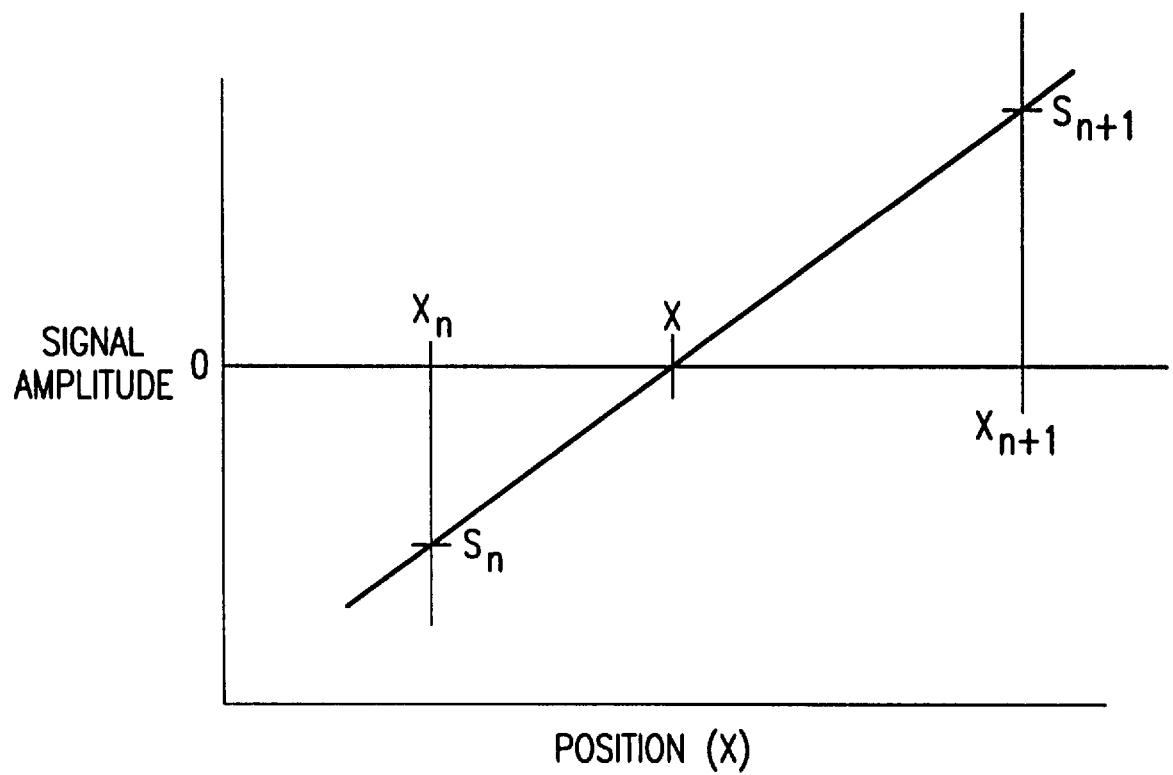
FIG. 19 shows an interpolation diagram used by the analyzing circuit shown in FIG. 11.

As shown in FIG. 19, the signal $S_n$ is the signal on one side of the zero amplitude crossing point "x" and signal $S_{n+1}$ is the signal on the other side of the zero amplitude crossing point "x". Position $x_n$ is the position for which the signal on the electrical output tap $470_n$ is zero. Position $x_{n+1}$ is the position for which the signal on the electrical output tap $470_{(n+1)}$ is zero.

The analyzing circuit 580 interpolates the actual position x of the transducer within 1 wavelength of the scale using the relationship:

$$x = \frac{(X_n \cdot S_{n+1}) - (X_{n+1} \cdot S_n)}{(S_{n+1} - S_n)} \quad (3)$$

where:

$S_n$ is the sampled signal at electrical output tap $470_n$; and
$S_{n+1}$ is the sampled signal at tap $470_{(n+1)}$.

After the analyzing circuit 580 interpolates the transducer position at step S1600, control returns to step S1200.

Figure 20:
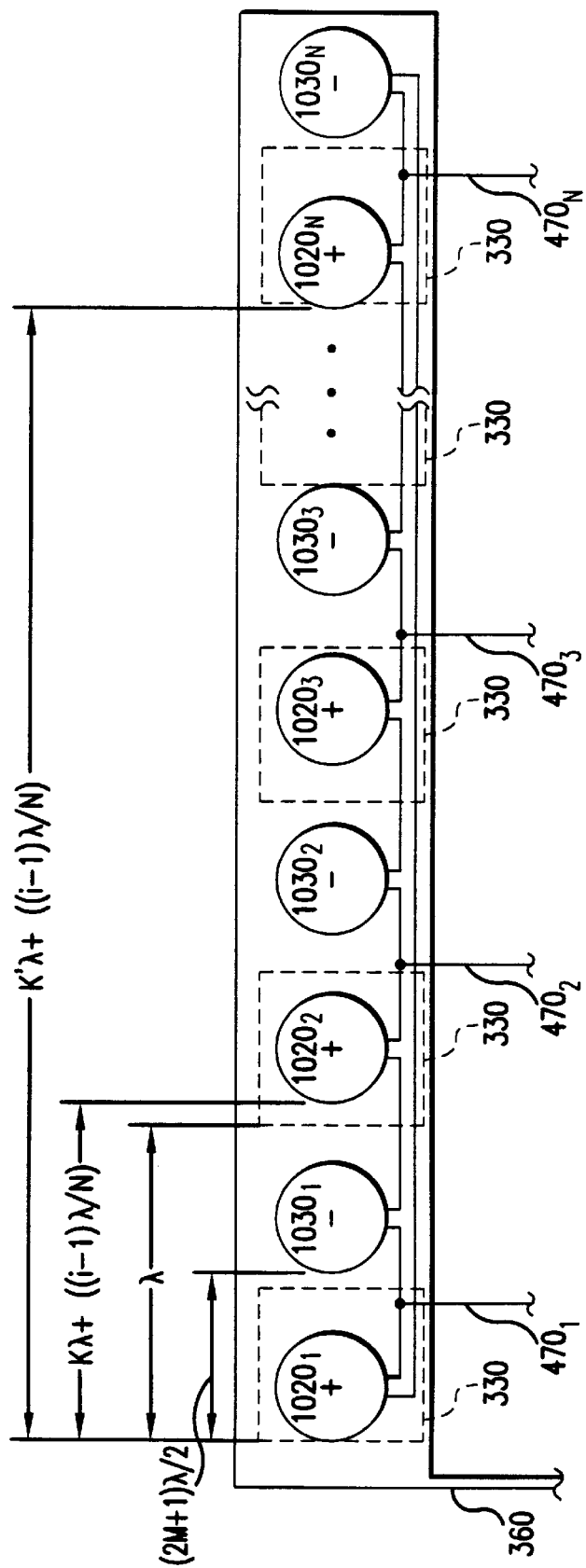
FIG. 20 shows a generalized embodiment of the receiver and the scale elements of the multi-tap induced current position transducer.

FIG. 20 shows a more generalized representation of the scale elements, the receiver and the transmitter of the multi-tap induced current position transducer of this invention. As shown in FIG. 20, the receivers 1020 and 1030 (or the transmitters 1020 and 1030 when the transducer in operated in reverse) can be any type of magnetic flux sensor (or generator), with a defined flux sensing (or generating) region that can be spatially positioned and electrically connected according to the principles described herein. As described herein, and in the incorporated references, it is preferable and practical that the positive polarity receivers 1020 and negative polarity receivers 1030 are connected in N pairs, where the subscripts denote the pair number "i" in FIG. 20. This arrangement cancels the "DC offset", as previously described. It is also preferable that receivers $1020_i$ and $1030_i$ are spaced at an interval of $(2M+1)\lambda/2$ from each other, to develop the best signal from a scale with wavelength λ, where M is an integer, greater than or equal to zero. It is usually most practical to choose M=0, and to serially connect the receivers $1020_i$ and $1030_i$, as shown in FIG. 20. The N receiver pairs (or transmitter pairs) 1020i and 1030i are connected in series, with the first receiver $1020_1$ also connected to the last receiver $1030_N$ to close the series circuit in a "loop". The scale elements 330 are distributed along the scale member at a pitch of λ. The transmitter (or receiver) 360 is shown as a winding surrounding the receivers (or transmitters) $1020_i$ and $1030_i$, and thus FIG. 20 corresponds to the embodiment shown in FIG. 5. However, it should be appreciated that the transmitter (or receiver) 360 can be positioned adjacent to the receivers (or transmitters) $1020_i$ and $1030_i$, corresponding to the embodiments shown in FIGS. 14–17. Furthermore, the transmitter 360 need not be a winding, but can be any type of magnetic flux generator.

FIG. 20 shows the general rule for positioning N receiver pairs comprising receivers $1020_i$ and $1030_i$. That is, taking the first receiver pair (i=1) as a spatial reference, the "$i^{th}$" receiver pair should be positioned at a distance of Kλ+((i−1)λ/N) relative to the first pair. As one example, in FIG. 8, K=0 for all receiver pairs, which leads to overlapping receiver loops, a compact transducer, and a simple layout for the electrical connections. However, for each receiver pair, K is independent. Thus, K may be any integer, although the layout of the electrical connections may become more complicated and the transducer length will increase when K is not zero. If K is non-zero, receiver pairs need not overlap, which may be best for some fabrication methods. Although FIG. 20 shows one tap 470 for each receiver pair, by analogy with previous discussions of FIGS. 7–10, taps may be provided at multiple locations in each receiver pair, so long as the principles of operation described with reference to FIG. 10 are followed. In any case, the scale is preferably long enough to span the entire set of receiver loops at all intended positions.

Accumulated displacement beyond one wavelength can be tracked by applying conventional techniques, known to those skilled in the art, to the position data from these transducers. Thus, displacements beyond one wavelength, and the associated positions may be readily computed and displayed. The signal processing and control circuit 370, including the multiplexers 530 and 540, the controller 550, the receiver circuit 560, the sample and hold circuit 570, the analyzing circuit 580 and the transmitter controller 590, is preferably implemented using a programmed microprocessor and peripheral integrated circuit elements, a programmed microcontroller and peripheral integrated circuit elements, an ASIC or other integrated circuit. However, the signal processing and control circuit 370 can also be implemented using a hard-wired electronic or logic circuit, such as a discrete element circuit, a programmable logic device such as a FPGA, a PLD, a PLA or a PAL, or the like. In general, any device in which a finite state machine capable of implementing the flowchart shown in FIG. 18 and capable of controlling the peripheral devices shown in FIGS. 5, 11 and 14–17 can be used to implement the signal processing and control circuit 370 of this invention.

For shorter range applications, other multi-tap transducer modifications are possible. FIG. 21 shows a multi-tap transducer 750 which is based on the transducer 700 of FIG. 15. In the multi-tap transducer 750, flexible electrical connections 761 and 762 are made between the transmitter driver circuit 380 and the connections on the scale member 310. Thus, the first coupling loop portions 712 and the transmitter loop 360 shown in FIG. 15 are eliminated in the multi-tap transducer 750. The second coupling loop portions 712 are serially connected as shown in FIG. 21 and are driven directly as a spatially modulated transmitter loop through the flexible electrical connections 761 and 762. The scale member 310 can move over the range of travel allowed by the electrical connections 761 and 762. Otherwise, the operation of multi-tap transducer 750 is identical to the operation of multi-tap transducer 700.

Furthermore, although the foregoing embodiments are shown with spatially uniform windings designated as the transmitter windings, and spatially modulated windings designated as the receiver windings, it will be apparent to one skilled in the art that the disclosed transducer winding configurations will retain all of their inventive benefits if the roles of the transmitter and receiver windings are "reversed" in conjunction with appropriate signal processing. While this invention has been described in conjunction with the specific embodiments outlined above, it is evident that many alternatives, modifications and variations will be apparent to those skilled in the art.

A special advantage of this system is obtained when the receiver windings are integrated into the same substrate as at least the multiplexers to reduce the connections to the outside environment.

Accordingly, the preferred embodiments of the invention as set forth above are intended to be illustrative, not limiting. Various changes may be made without departing from the spirit and scope of the invention as defined in the following claims.

What is claimed is:

1. A multi-tap induced current position transducer, comprising:
    a first member including at least one scale element arranged along a measuring axis; and
    a second member positioned adjacent to and movable relative to the first member along the measuring axis, comprising:
        a first winding,
        a second winding comprising a plurality of serially-connected spatially modulated portions extending along the measuring axis, each spatially modulated portion having a defined spatial phase,
        a plurality of selectable tap connections on the spatially modulated portions, and
        signal generating and processing circuitry connected to the first winding and selectively connectable to the second winding through the plurality of selectable taps;
    wherein:
        the signal generating and processing circuitry drives one of the first and second windings to generate a changing magnetic flux,
        the signal generating and processing circuitry inputs an input signal derived from a distributed EMF induced in the other of the first and second winding by the changing magnetic flux generated by the one of the first and second windings, and
        the input signal depending on selected ones of the taps and a relative position between the at least one scale element and the second winding, the at least one scale element spatially modulating the effective flux coupling between the first and second windings based on the relative position.

2. The multi-tap induced current position transducer of claim 1, wherein the signal generating and processing circuitry determines the relative position based on the input signal and the selected taps.

3. The multi-tap induced current position transducer of claim 2, wherein the relative position is determined to a first resolution based on the selected taps.

4. The multi-tap induced current position transducer of claim 3, wherein the relative position is determined, based on the input signal, to a second resolution that is finer than the first resolution.

5. The multi-tap induced current position transducer of claim 1, wherein the signal generating and processing circuitry selects ones of the taps for a current signal sampling cycle based on an analysis of the input signal from a previous signal sampling cycle.

6. The multi-tap induced current position transducer of claim 1, wherein the signal generating and processing circuitry selects a pair of taps for each signal sampling cycle, the tap pair selected such that the signal contributions of at least two serially-connected spatially modulated portions are combined to produce the input signal.

7. The multi-tap induced current position transducer of claim 6, wherein each tap pair is selected such that the signal contributions of approximately one-half of the plurality of serially-connected spatially modulated portions are combined to produce the input signal.

8. The multi-tap induced current position transducer of claim 7, wherein the signal generating and processing circuitry identifies the tap pair corresponding to a minimum input signal amplitude and determines the relative position based on the identified tap pair.

9. The multi-tap induced current position transducer of claim 1, wherein at least one of a phase, a polarity, and an amplitude of the input signal depends on selected ones of the taps and the relative position between the at least one scale element and the second winding.

10. The multi-tap induced current position transducer of claim 1, wherein the at least one scale element comprises a plurality of scale elements distributed along the measuring axis at a pitch $\lambda$.

11. The multi-tap induced current position transducer of claim 10, wherein the plurality of spatially modulated portions are offset from each other along the measuring axis by a predetermined offset amount based upon a number N of the plurality of spatially modulated portions and the pitch $\lambda$.

12. The multi-tap induced current position transducer of claim 11, wherein the predetermined offset amount is $\lambda(kN+1)/N$, where k and N are integers.

13. The multi-tap induced current position transducer of claim 12, wherein k=0 and the plurality of spatially modulated portions partially overlap each other.

14. The multi-tap induced current position transducer of claim 1, wherein all spatially modulated portions have a positive polarity region providing a first signal contribution and electrically connected to a negative polarity region providing a second signal contribution that balances the first signal contribution, such that, during operation in absence of scale elements, a signal contribution from each spatially modulated portion is approximately zero.

15. The multi-tap induced current position transducer of claim 14, wherein each positive polarity portion and each negative polarity portion has a length along the measuring axis approximately equal to one-half the pitch $\lambda$, all spatially modulated portions are geometrically similar and have a length along the measuring axis approximately equal to the pitch $\lambda$, and all scale elements are geometrically similar and have a length along the measuring axis equal to one-half of the pitch $\lambda$.

16. The multi-tap induced current position transducer of claim 1, wherein a start point of a first one of the plurality of spatially modulated portions is connected to an end point of a last one of the plurality of spatially modulated portions.

17. The multi-tap induced current position transducer of claim 1, wherein the second winding is formed such that signal contributions from all of the plurality of spatially modulated portions form a vector circle, such that, regardless of scale position, approximately zero current flow is induced in the second winding during operation.

18. The multi-tap induced current position transducer of claim 1, wherein the at least one scale element comprises a plurality of flux modulators.

19. The multi-tap induced current position transducer of claim 18, wherein the flux modulators are at least one of flux enhancers and flux disrupters.

20. The multi-tap induced current position transducer of claim 1, wherein the scale elements are coupling loops.

21. The multi-tap induced current position transducer of claim 1, wherein the first and second windings are generally parallel and approximately coextensive along the measuring axis.

22. The multi-tap induced current position transducer of claim 21, wherein the second winding is positioned inside of the first winding.

23. The multi-tap induced current position transducer of claim 21, wherein the first winding is positioned adjacent to the second winding.

24. The multi-tap induced current position transducer of claim 23, wherein the first winding has a plurality of winding portions, the second winding positioned adjacent to at least one of the winding portions.

25. The multi-tap induced current position transducer of claim 24, wherein the first winding has a pair of winding portions, the second winding positioned between the pair of winding portions.

26. The multi-tap induced current position transducer of claim 1, wherein the signal generating and processing circuitry drives the first winding and inputs the input signal from the second winding.

27. The multi-tap induced current position transducer of claim 26, wherein the signal generating and processing circuitry comprises:
   a controller;
   a transmitter driver connected to the first winding and the controller;
   a multiplexer connected to the taps of the second winding and to the controller;
   a demodulator connected to the multiplexer; and
   an analyzing circuit connected to the demodulator that outputs at least one signal based on the input signal and related to the relative position.

28. The multi-tap induced current position transducer of claim 27, wherein the at least one signal includes a control signal sent to the controller, the selected taps selected based on the control signal.

29. The multi-tap induced current position transducer of claim 27, wherein the at least one signal includes an output signal indicative of the relative position.

30. The multi-tap induced current position transducer of claim 27, wherein the demodulator comprises:
   a receiver circuit including an amplifier circuit; and
   a sample and hold circuit connected to the receiver circuit and synchronized with the induced EMF.

31. The multi-tap induced current position transducer of claim 1, wherein the signal generating and processing circuitry drives the second winding and inputs the input signal from the first winding.

32. The multi-tap induced current position transducer of claim 31, wherein the signal generating and processing circuitry comprises:
   a controller;
   a multiplexer connected to the taps of the second winding and to the controller;
   a transmitter driver connected to the controller and to the multiplexer;
   a demodulator connected to the first winding; and
   an analyzing circuit connected to the demodulator and outputting at least one signal based on the input signal.

33. A multi-tap induced current position transducer, comprising:
   a first member including a first spatially modulated winding
   a second member positioned adjacent to and movable relative to the first member along the measuring axis, comprising:
      a second winding comprising a plurality of serially-connected spatially modulated portions extending along the measuring axis, each spatially modulated portion having a defined spatial phase,
      a plurality of selectable taps on the spatially modulated portions, and
      signal generating and processing circuitry connected to the first winding and selectively connectable to the second winding through the plurality of selectable taps;
   wherein:
      the signal generating and processing circuitry drives one of the first and second windings to generate a changing magnetic flux,
      the signal generating and processing circuitry inputs an input signal derived from a distributed EMF induced in the other of the first and second winding by the changing magnetic flux generated by the one of the first and second windings based on the spatially modulated effective flux coupling between the first and second windings, and
      the input signal depending on the selected ones of the taps and a relative position between the first and second winding.

34. A multi-tap induced current position transducer, comprising:
   a first member including at least one scale element arranged along a measuring axis; and
   a second member positioned adjacent to the first member, and movable relative to the first member along the measuring axis; and
   a first winding positioned relative to one of the first and second members, wherein the second member comprises:
      a second winding comprising a plurality of serially-connected spatially modulated portions extending along the measuring axis, each spatially modulated portion having a defined spatial phase,
      a plurality of selectable tap connections on the spatially modulated portions, and
      signal generating and processing circuitry connected to the first winding and selectively connectable to the second winding through the plurality of selectable taps;
   wherein:
      the signal generating and processing circuitry drives one of the first and second windings to generate a changing magnetic flux,
      the signal generating and processing circuitry inputs an input signal derived from a distributed EMF induced in the other of the first and second winding by the changing magnetic flux generated by the one of the first and second windings, and
      the input signal depending on selected ones of the taps and a relative position between the at least one scale element and the second winding, the at least one scale element spatially modulating the effective flux coupling between the first and second windings based on the relative position.

35. The multi-tap induced current position transducer of claim 34, wherein the measuring axis is circular.

36. The multi-tap induced current position transducer of claim 34, wherein the first and second widindings and the at least one scale element are each substantially planar.

37. A method for determining a position of a magnetic flux sensing winding relative to periodic spatial modulations in a spatially-modulated, time-varying magnetic field extending along a measuring axis, the magnetic flux sensing winding comprising:
- a plurality of serially-connected spatially modulated portions extending along the measuring axis, each spatially modulated portion having a defined spatial phase,
- a plurality of selectable taps on the spatially modulated portions, and
- signal processing circuitry selectively connectable to the magnetic flux sensing winding through the plurality of selectable taps;

the method comprising:
- inducing a distributed EMF in the magnetic flux sensing winding in response to the spatially-modulated, time-varying magnetic field;
- selecting a set of taps for each signal sampling cycle, the set of taps selected such that the signal contributions of a number of serially-connected spatially modulated portions are combined to produce an input signal derived from the distributed EMF;
- inputting the input signal to the signal processing circuitry;
- measuring a characteristic of the input signal,
- determining a relative position between the magnetic flux sensing winding and the spatially-modulated, time-varying magnetic field based on the selected taps and the corresponding input signal characteristic.

38. The method of claim 37, wherein:
- selecting the set of taps includes selecting a pair of taps such that the number of serially-connected spatially modulated portions produces a maximum theoretically-possible value of the input signal characteristic, and
- determining the relative position includes identifying a tap pair selected according to the pair of taps selecting step corresponding to a minimum value of the input signal characteristic.

39. The method of claim 37, wherein the measuring axis is circular.

40. The method of claim 37, wherein selecting a set of taps for each signal sampling cycle comprises:
- selecting a first one of the plurality of selectable taps, the first tap having a spatial phase;
- selecting a second tap, the second tap being one of:
  - an opposing tap having a spatial phase most nearly 180 degrees out of phase from the spatial phase of the first tap, and
  - a tap adjacent to the opposing tap;
- determining a value of the of the input signal characteristic corresponding to the first and second taps;
- reselecting at least one of the first and second taps; and
- repeating the determining and reselecting steps until a minimum value of the input signal characteristic is identified.

* * * * *